United States Patent
Afridi et al.

(10) Patent No.: US 11,381,159 B2
(45) Date of Patent: Jul. 5, 2022

(54) HIGH POWER DENSITY POWER CONVERTER AND UNINTERRUPTIBLE POWER SUPPLY CIRCUIT AND METHODS

(71) Applicants: Cornell University, Ithaca, NY (US); The Regents of the University of Colorado, a body corporate, Denver, CO (US)

(72) Inventors: Khurram Afridi, Boulder, CO (US); Nauman Zaffar, Boulder, CO (US); Danish Shahzad, Ithaca, NY (US)

(73) Assignees: Cornell University, Ithaca, NY (US); The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 17/274,092

(22) PCT Filed: Sep. 6, 2019

(86) PCT No.: PCT/US2019/050100
§ 371 (c)(1),
(2) Date: Mar. 5, 2021

(87) PCT Pub. No.: WO2020/051557
PCT Pub. Date: Mar. 12, 2020

(65) Prior Publication Data
US 2021/0194356 A1    Jun. 24, 2021

Related U.S. Application Data

(60) Provisional application No. 62/727,659, filed on Sep. 6, 2018.

(51) Int. Cl.
*H02M 1/42* (2007.01)
*H02M 5/458* (2006.01)
(Continued)

(52) U.S. Cl.
CPC ........... *H02M 1/4233* (2013.01); *H02J 9/062* (2013.01); *H02M 3/1582* (2013.01); *H02M 5/4585* (2013.01)

(58) Field of Classification Search
CPC ............. H02M 1/4233; H02M 3/1582; H02M 5/4585; H02J 9/062; Y02B 70/10
See application file for complete search history.

(56) References Cited

U.S. PATENT DOCUMENTS 5,017,800 A * 5/1991 Divan .................. H02M 5/458
307/66
2001/0001535 A1    5/2001 Johnson, Jr. et al.
(Continued)

FOREIGN PATENT DOCUMENTS

KR        101303200 B1    9/2013

OTHER PUBLICATIONS

Shin, Jong-Won, et al., "Low-Common Mode Voltage H-Bridge Converter with Additional Switch Legs", IEEE Transactions on Power Electronics, Aug. 27, 2012, vol. 28, Issue 4, pp. 1773-1782.
(Continued)

*Primary Examiner* — Toan T Vu
(74) *Attorney, Agent, or Firm* — Hodgson Russ LLP

(57) ABSTRACT

The present disclosure provides a high-power-density power converter topology with a common neutral between its input and output AC ports while having a single DC bus. The topology may also be embodied as an online uninterruptible power supply (UPS). The presently-disclosed topology enables high power density by utilizing half-bridge switch structures suitable for MHz-frequency operation.

19 Claims, 19 Drawing Sheets

(51) Int. Cl.
*H02M 3/158* (2006.01)
*H02J 9/06* (2006.01)

(56) References Cited

U.S. PATENT DOCUMENTS

| | | |
|---|---|---|
| 2008/0094019 A1* | 4/2008 | Steigerwald ........ H02M 3/1582 318/599 |
| 2008/0298103 A1 | 12/2008 | Bendre et al. |
| 2016/0006295 A1 | 1/2016 | Yang et al. |
| 2017/0054383 A1 | 2/2017 | Mouridsen |
| 2017/0077749 A1 | 3/2017 | Xu et al. |

OTHER PUBLICATIONS

Shin, Jong-Won, et al., "A low-common mode noise and high-efficiency buck-buck-boost inverter", IEEE Applied Power Electronics Conference and Exposition (APEC), Mar. 17, 2013, pp. 2259-2265.

* cited by examiner

550

553
PROVIDING A FIRST INVERTER SWITCH IN SERIES WITH A SECOND INVERTER SWITCH, AND CONNECTED FROM A NEUTRAL OF AN AC OUTPUT TO A DC BUS.

556
SWITCHING THE FIRST INVERTER SWITCH AND THE SECOND INVERTER SWITCH TO PROVIDE A POSITIVE AC COMPONENT ON A PHASE OUTPUT.

559
PROVIDING A THIRD INVERTER SWITCH IN SERIES WITH A FOURTH INVERTER SWITCH, AND CONNECTED FROM THE PHASE OUTPUT TO THE DC BUS.

562
SWITCHING THE THIRD INVERTER SWITCH AND THE FOURTH INVERTER SWITCH TO PROVIDE A NEGATIVE AC COMPONENT ON THE PHASE OUTPUT.

Fig. 20

HIGH POWER DENSITY POWER CONVERTER AND UNINTERRUPTIBLE POWER SUPPLY CIRCUIT AND METHODS

CROSS-REFERENCE TO RELATED APPLICATIONS

This application claims priority to U.S. Provisional Application No. 62/727,659, filed on Sep. 6, 2018, now pending, the disclosure of which is incorporated herein by reference.

FIELD OF THE DISCLOSURE

The present disclosure relates to power conversion, and more particularly to online, uninterruptible power supplies (UPS).

BACKGROUND OF THE DISCLOSURE

High power density power converters are desirable for virtually every application, but indispensable in applications with space or weight constraints such as data centers, lighting, renewable energy, medical, mobile, automotive, marine, and aerospace applications. Achieving high power density in AC-DC, DC-AC and AC-AC power converters is especially difficult due to the need for twice-line-frequency energy buffering and operation across wide input and/or output voltages. An example of an AC/AC converter is an online uninterruptible power supply (UPS). In an online UPS, unlike other types of UPSs (such as line-interactive UPS), all the power from the line is processed before being delivered to the loads. Online UPSs provide reliable and high-quality AC voltage to their loads. Online UPSs are commonly utilized in data-centers, where an exponential increase in user data is putting additional constraints on the space available for power conversion. Consequently, the volume (and hence the power density) of online UPS systems has become a key performance metric. To achieve high power densities, online UPS systems utilize designs that do not incorporate bulky transformers. However, such transformer-less designs require a common neutral between the AC input and output ports due to safety-driven grounding requirements. The online UPS size can be further reduced by increasing the switching frequency, provided the online UPS topology is amenable to high-frequency operation.

A commonly utilized topology for an online UPS is shown in the FIG. 1. The topology includes a rectifier stage (i.e., an AC-DC converter) that is derived from a three-level bridgeless boost converter topology comprising a four-quadrant active switch (implemented using $S_1$ and $S_2$) and synchronous boost switches ($S_3$ and $S_4$). The design uses a buck-type inverter (DC-AC converter) that is a time-reversed dual of the rectifier stage, which produces a sinusoidal output voltage for the load by appropriately switching $S_5$-$S_8$. Between the rectifier stage and the inverter stage is a capacitor-based split-DC-bus twice-line-frequency energy buffer, which manages the instantaneous difference between the input and output power. The presence of four-quadrant switches in this topology results in relatively large high-frequency-loop inductances, which limit switching frequency. Furthermore, the split DC bus introduces challenges in terms of capacitor voltage balancing especially when delivering power to loads that draw different amounts of power in positive and negative half-line cycles. Furthermore, the volume of required bus capacitors in split-bus architectures can adversely affect power density of the overall system, especially when out-of-phase operation is desired from the online UPS. Other online UPS topologies, that have a common neutral between input and output AC ports, have also been reported. However, these topologies also have several drawbacks, such as high DC-bus voltage requirements, a need for more than two inductors, or higher switch counts, which limit their power density or increase their control complexity. Various soft-switched UPS topologies suitable for high-frequency operation have also been reported. However, these topologies either require a transformer to achieve common-neutral configuration or require extra passive components to accomplish soft-switching. Therefore, there continues to be a need for a common-neutral, transformerless power converter topology which is suitable for high-frequency operation while avoiding a split DC bus.

BRIEF SUMMARY OF THE DISCLOSURE

In an aspect, the present disclosure provides a high-power-density AC-AC power converter topology with a common neutral between its input and output AC ports while having a single DC bus. This AC-AC power converter is formed by cascading a presented high-power-density AC-DC power converter topology and a presented high-power-density DC-AC power converter topology, which are able to provide the common neutral between the input and output AC ports. The AC-AC power converter topology may also be embodied as an online uninterruptible power supply (UPS) by additionally incorporating a battery (or some other energy storage device) from which power can be sourced and delivered to the loads even when the input power supply is lost. The presently-disclosed topology enables high power density by utilizing half-bridge switch structures suitable for high-frequency (e.g., MHz-range frequency) operation. A prototype based on an example embodiment of the disclosed topology was built and tested. This electrolytic-capacitor-free 1-kVA prototype converter used GaN transistors and operated at switching frequencies up to 2 MHz. The prototype converter achieved a power density of 26.4 W/in$^3$.

A control strategy suitable for use with the disclosed converter is also presented. The control strategy utilizes a dual-mode operation (i.e., uses two different modes of operation, one for positive half-cycles and one for negative half-cycles) to achieve input power factor correction (PFC) for the rectification (AC-DC) stage of the converter. An inversion (DC-AC) stage of the converter may also be operated in dual mode, wherein a digital or analog controller regulates the output voltage (or output current) of the converter for both resistive and reactive loads. The rectification stage and the inversion stage can be operated as either hard-switched or as soft-switched converters. The rectifier of the built and tested prototype is operated as a soft-switched converter by operating in boundary conduction mode, while the inverter of the built and tested prototype is operated as a hard-switched converter.

Applications of the technology presented here may include, without limitations, online UPS, frequency changers, solid-state transformers, motor drives, cranes, active filters and reactive power compensation systems, renewable energy systems including wind and wave energy systems, traction systems, electric and hybrid electric vehicle drives, laser driver systems, electromagnetic launch systems, electromagnetic guns, electromagnetic brakes and propulsion systems, lighting systems, and power systems for implanted medical devices.

DESCRIPTION OF THE DRAWINGS

For a fuller understanding of the nature and objects of the disclosure, reference should be made to the following detailed description taken in conjunction with the accompanying drawings, in which:

FIG. 20 is a chart showing a method according to another embodiment of the present disclosure.

DETAILED DESCRIPTION OF THE DISCLOSURE

Figure 1:
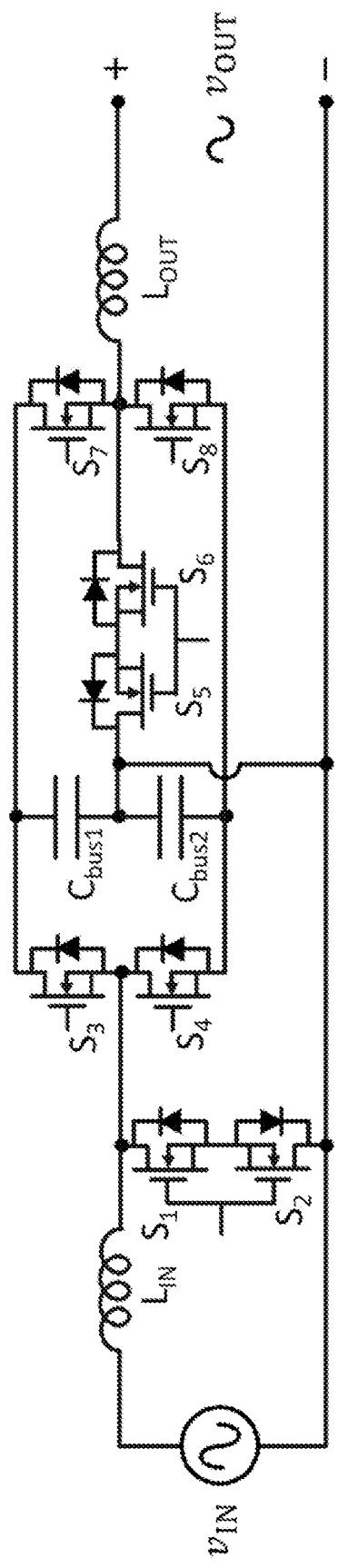
FIG. 1 is a diagram of a conventional online UPS topology with a split voltage bus and a common-neutral between its AC input and AC output ports.
Figure 2:
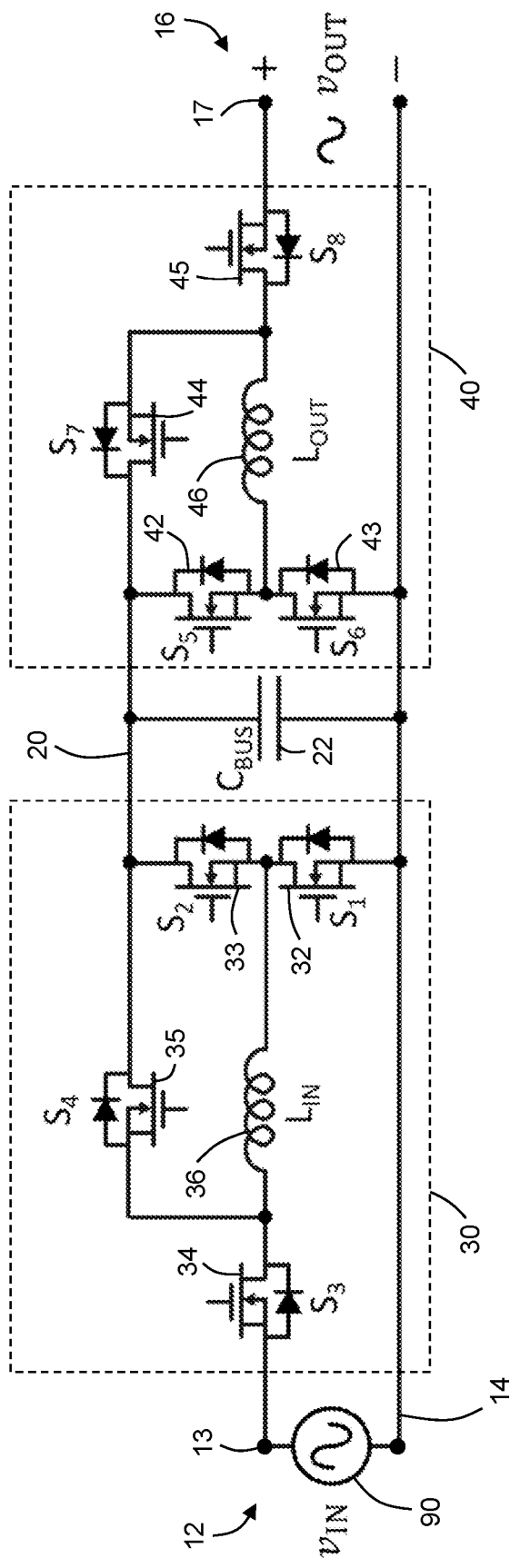
FIG. 2 is a diagram of a power converter according to an embodiment of the presently disclosure, the converter having a common-neutral between its AC input and AC output ports that utilizes only half-bridge switch structures and has a single DC bus.

The present disclosure provides a soft-switching and/or hard-switching transformer-less AC-AC power converter topology (and its constituent AC-DC and DC-AC power conversion topologies), for example, an uninterruptible power supply (UPS) topology, that enables significant size reduction by operating efficiently at high switching frequencies (e.g., MHz frequencies) while having a single DC bus. Embodiments of the present disclosure utilize half-bridge structures with a common-neutral between the input and output and can achieve zero-voltage switching (ZVS) operation without any additional circuit complexity. An exemplary embodiment of the topology is shown in FIG. 2. The exemplary embodiment has a single DC bus at a voltage that may only be slightly higher than the peak of the line voltage. Such a design allows the UPS battery (or other energy storage device) to be referenced to the common neutral. The disclosed topology also allows independent control of input current, the intermediate DC bus voltage, and the output voltage or current.

In addition, a new control methodology for the disclosed online UPS is also presented herein, which utilizes a dual-mode controller for the input PFC rectifier stage. The inversion (DC-AC) stage is also operated in dual mode, wherein a digital and/or analog controller regulates the output voltage (or output current) of the converter for both resistive and reactive loads. An example embodiment of the present converter is capable of delivering 1-kVA of output power while maintaining unity power factor at its input. A 1-kVA electrolytic-capacitor-free prototype online UPS based on the proposed topology, utilizing GaN transistors and operating at switching frequencies up to 2 MHz, is built and tested (further described below). The prototype UPS achieved a power density of 26.4 W/in³.

Converter Topology

The present disclosure may be embodied as a power converter 10 (see, e.g., FIG. 2). The converter 10 comprises an input (i.e., front-end) power factor correction (PFC)

rectifier stage. The converter 10 may also have a voltage mode or current mode inverter stage. The converter 10 may also have an energy buffering capacitor placed across an intermediate DC bus.

A power converter 10 of the present disclosure includes an AC input 12 having a phase input 13 and a common neutral 14. The AC input 12 is configured for connection to an AC power source 90 such as, for example, utility mains.

The converter 10 has a DC bus 20, which may be coupled to the common neutral 14 by a capacitive element 22. The capacitive element 22 is configured to store a positive DC voltage with respect to a voltage of the common neutral 14. The capacitive element may be, for example, one or more capacitor(s), supercapacitor(s), battery(ies), or the like.

A power factor correction (PFC) rectifier (generally shown in FIG. 2 by the dashed outline 30) couples the AC input 12 to the DC bus 20. The rectifier 30 includes a first half bridge connected from the common neutral 14 to the DC bus 20. The first half bridge has a first switch 32 connected in series with a second switch 33. The first switch 32 has a closed state (i.e., a closed, or 'short,' circuit allowing current to flow through the switch) and the second switch 33 has an open state (i.e., an open circuit not allowing current flow through the switch) when a voltage of the phase input 13 is negative with respect to the common neutral 14. A second half bridge is connected from the phase input 13 to the DC bus 20. The second half bridge is made up of a third switch 34 connected in series with a fourth switch 35. The third switch 34 has a closed state and the fourth switch 35 has an open state when the voltage of the phase input 13 is positive with respect to the common neutral 14. When a voltage of the phase input 13 is positive with respect to the common neutral 14, the first switch 32 and the second switch 33 are switched between closed and open states at a switching frequency in a complementary manner (i.e., when one switch is on, the other switch is off, and vice versa). When a voltage of the phase input 13 is negative with respect to the common neutral 14, the third switch 34 and the fourth switch 35 are switched between closed and open states at a switching frequency in a complementary manner.

The rectifier 30 also includes an input inductor 36 having a first end connected between the first switch 32 and the second switch 33, and a second end connected between the third switch 34 and the fourth switch 35.

A controller (such as, for example, controller 150 of FIG. 5) is configured to vary an on-time of the first switch 32 and/or an on-time of the third switch 34 to control the DC bus voltage and a current through the input inductor 36 for a unity power factor at the AC input 12 (as further discussed below).

Some embodiments of the converter 10 include an inverter (generally shown in FIG. 2 by the dashed outline 40) that couples the DC bus 20 to an AC output 16 for connection to one or more electrical loads. The AC output 16 of the inverter 40 has a phase output 17 (and includes the common neutral 14). The inverter 40 includes a third half bridge (sometimes referred to herein as a "first inverter bridge") connected from the DC bus 20 to the common neutral 14. The third half bridge has a fifth switch 42 (sometimes referred to herein as a "first inverter switch") connected in series with a sixth switch 43 (sometimes referred to herein as a "second inverter switch"). The fifth switch 42 has an open state (i.e., an open circuit not allowing current flow through the switch) and the sixth switch 43 has a closed state (i.e., a closed, or 'short,' circuit allowing current to flow through the switch) when a voltage of the phase output 17 is negative with respect to the common neutral 14. A fourth half bridge (sometimes referred to herein as a "second inverter bridge") is connected from the DC bus 20 to the phase output 17. The fourth half bridge is made up of a seventh switch 44 (sometimes referred to herein as a "third inverter switch") connected in series with an eighth switch 45 (sometimes referred to herein as a "fourth inverter switch"). The seventh switch 44 has an open state and the eighth switch 45 has a closed state when the voltage of the phase output 17 is positive with respect to the common neutral 14. When a voltage of the phase output 17 is positive with respect to the common neutral 14, the fifth switch 42 and the sixth switch 43 are switched between closed and open states at a switching frequency in a complementary manner (i.e., when one switch is on, the other switch is off, and vice versa). When a voltage of the phase output 17 is negative with respect to the common neutral 14, the seventh switch 44 and the eighth switch 45 are switched between closed and open states at a switching frequency in a complementary manner.

The inverter 40 also includes an output inductor 46 having a first end connected between the fifth switch 42 and the sixth switch 43, and a second end connected between the seventh switch 44 and the eighth switch 45.

In embodiments having an inverter 40, the controller may be configured to vary an on-time of the sixth switch 43 and/or an on-time of the eighth switch 45 to control a voltage and/or current of the AC output 16 (as further discussed below).

Each stage of the exemplary embodiment depicted in FIG. 2 contains two half-bridges ($S_1/S_2$, $S_3/S_4$, $S_5/S_6$, and $S_7/S_8$), which can be realized using standard FETs (instead of four-quadrant switches) or other components (e.g., diodes, transistors, etc.) as described herein. The two half-bridges of each stage can be laid out with low high-frequency-loop inductances, enabling operation at high switching frequencies. This topology provides a common-neutral between its AC input and output ports. Embodiments may also have a single DC-bus capacitor ($C_{BUS}$) as a twice-line-frequency energy buffer (though it should be noted that more than one capacitor may be used). This example topology also allows independent control of input current, the intermediate DC bus voltage, and the output voltage (or current).

Figure 3A:
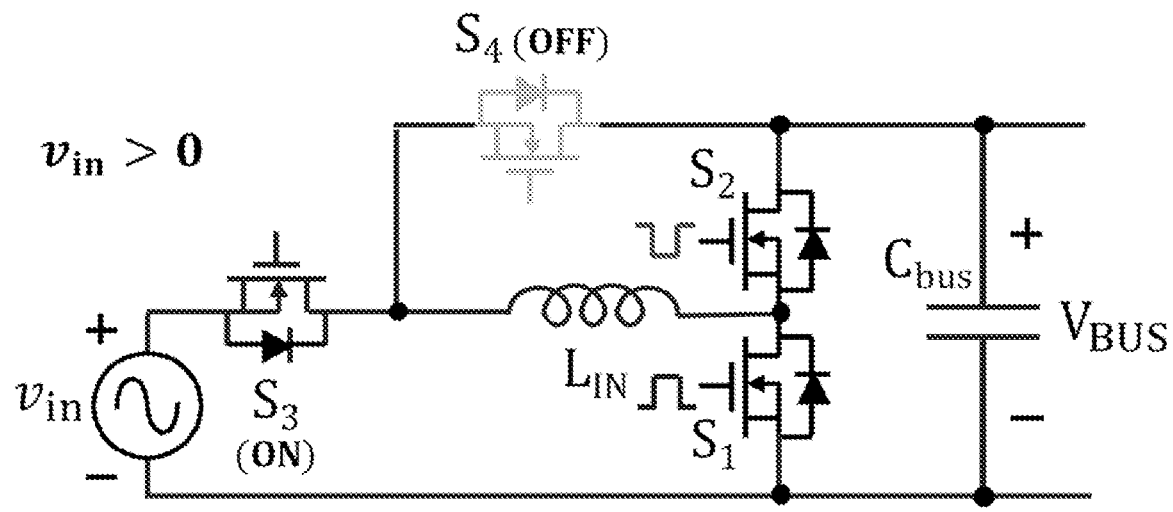
FIG. 3A is a diagram showing the operating mode of the rectifier stage of FIG. 2 for positive input voltage.
Figure 3B:
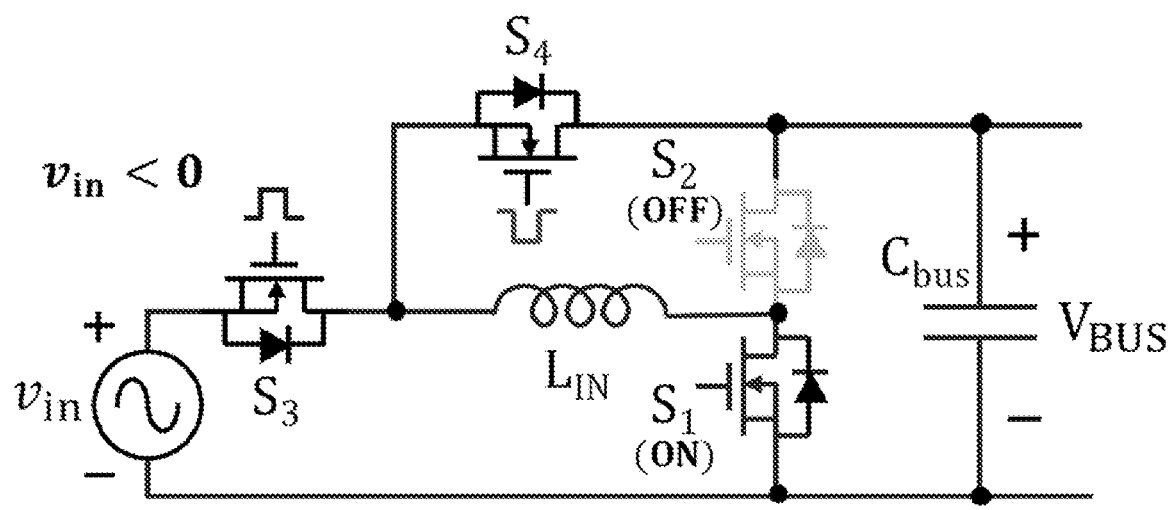
FIG. 3B is a diagram showing the operating mode of the rectifier stage of FIG. 2 for negative input voltage.

The operation of the rectifier stage is shown in FIGS. 3A and 3B. Two half-bridges ($S_1/S_2$ and $S_3/S_4$) are controlled by a controller to act as a PFC rectifier and produce a DC voltage across a single (unipolar) DC bus (i.e., across $C_{BUS}$) from the AC input ($v_{IN}$). Depending on the polarity of the input voltage ($v_{in}$), the rectifier operates in either boost or buck-boost mode. In the positive half-line cycle of the input voltage, the rectifier operates in the boost mode by keeping the third switch $S_3$ closed and the fourth switch $S_4$ open, while switching the first switch $S_1$ and the second switch $S_2$ at a high frequency in a complementary manner, as shown in FIG. 3A (switching frequency is further described below). On the other hand, during the negative half-line cycle of the input voltage, the rectifier operates in the buck-boost mode by keeping the first switch $S_1$ closed and the second switch $S_2$ open, while switching $S_3$ and $S_4$ at a high frequency in a complementary manner, as shown in FIG. 3B. For low power applications, the synchronous switches ($S_2$ and $S_4$) can be replaced by diodes, in favor of reduced gate drive complexity and simplified operation. The on and off times of the high-frequency switches are controlled in both half-line cycles to draw sinusoidal current from the AC input port at unity power factor while regulating the DC bus voltage ($V_{BUS}$).

Figure 19:
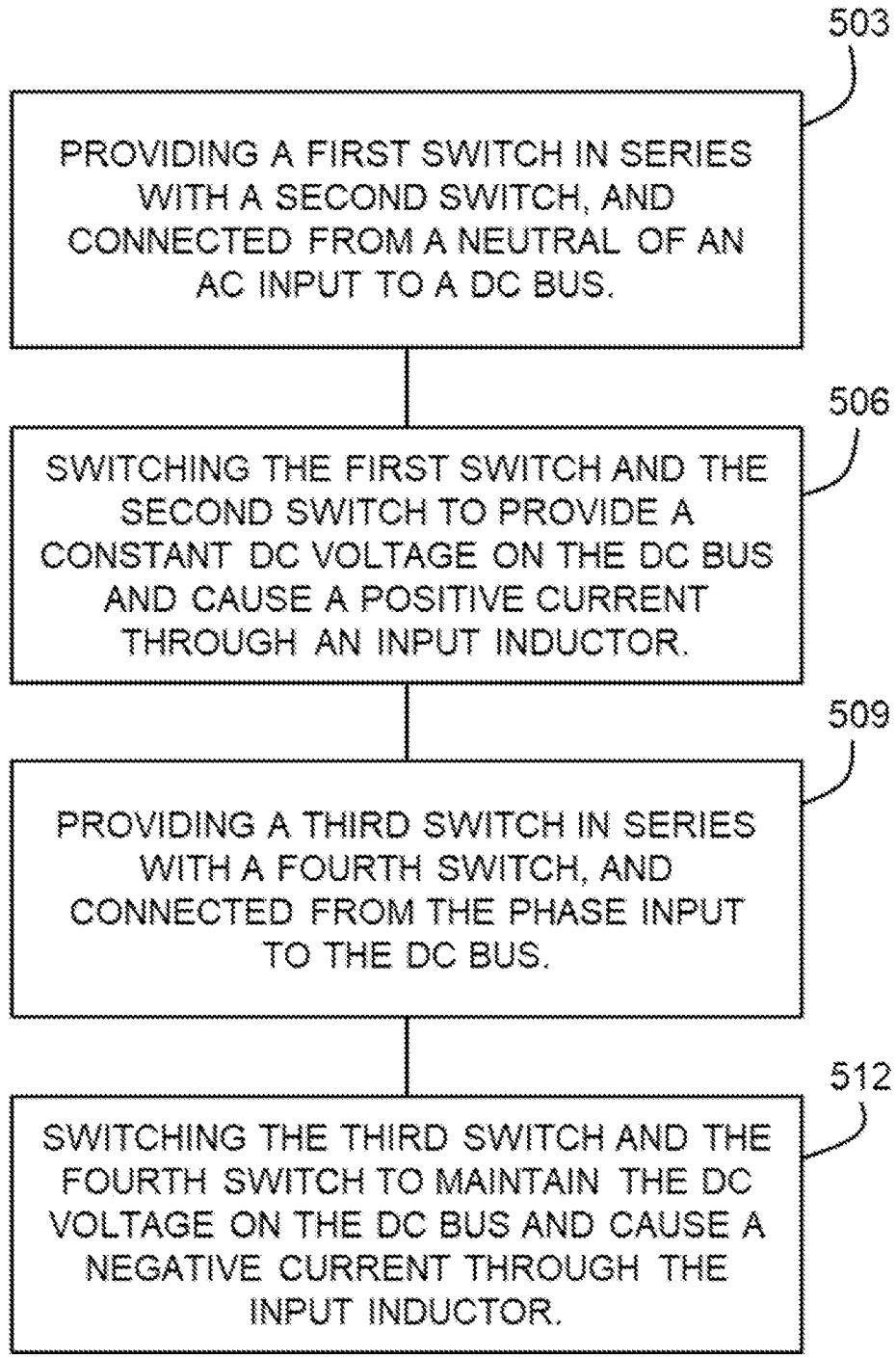
FIG. 19 is a chart showing a method according to an embodiment of the present disclosure.

With reference to FIG. 19, the present disclosure may be embodied as a method 500 for rectification and power factor correction of an AC input signal. The method 500 includes providing 503 a first switch in series with a second switch and connected from a neutral of the AC input to a DC bus. When a voltage of the AC input is positive, the first switch and the second switch are switched 506, so as to maintain a constant DC voltage on the DC bus and to cause a positive current through an input inductor connected from a phase input of the AC input to the neutral. A third switch is provided 509 in series with a fourth switch and connected from the phase input to the DC bus. When the voltage of the AC input is negative, the third switch and the fourth switch are switched 512 so as to maintain the constant DC voltage on the DC bus and to cause a negative current through the input inductor. The on-time of the first switch and the on-time of the third switch are selected such that a current of the input inductor varies in phase with the voltage of the AC input while maintaining the constant DC voltage on the DC bus.

Figure 4A:
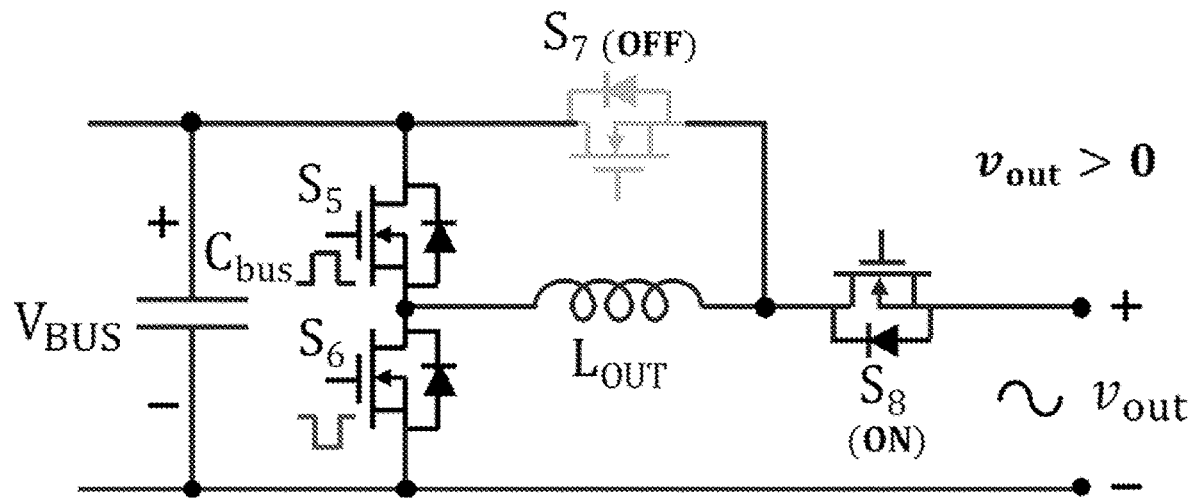
FIG. 4A is a diagram showing the operating mode of the inverter stage of FIG. 2 for positive output voltage.
Figure 4B:
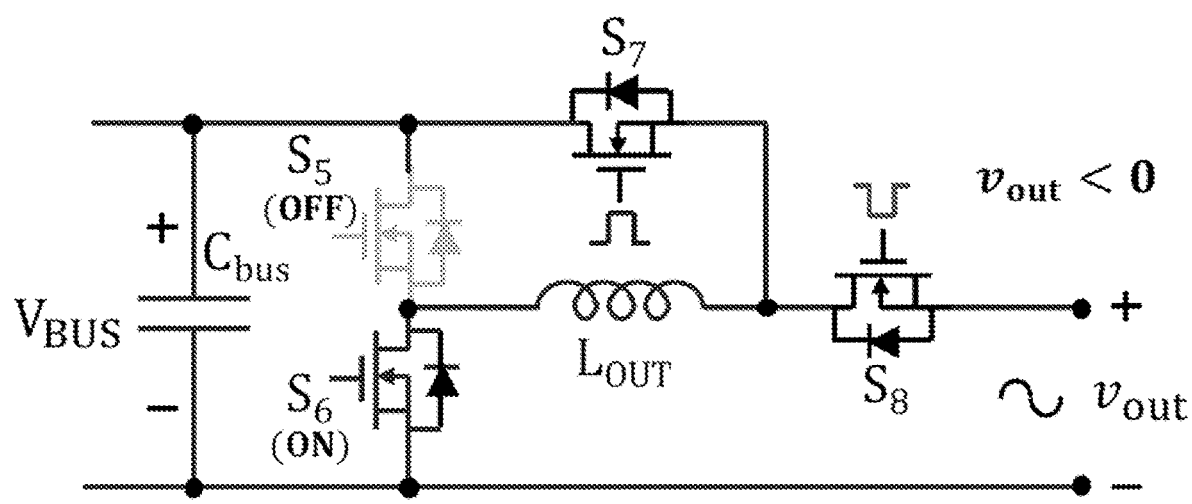
FIG. 4B is a diagram showing the operating mode of the inverter stage of FIG. 2 for negative output voltage.

The operation of the inverter stage is illustrated in FIGS. 4A and 4B. The two half-bridges ($S_5/S_6$ and $S_7/S_8$) are controlled, for example, by a controller, to produce a high quality output voltage ($v_{OUT}$) and waveform (e.g., sinusoidal, etc.) of desired amplitude and frequency The inverter stage is a time-reversed dual of the rectifier stage and also utilizes two different switching schemes, depending on the polarity of the output voltage ($v_{out}$). To produce a positive output voltage, the inverter operates in buck mode by keeping the eighth switch $S_8$ closed and the seventh switch $S_7$ open, while switching the fifth switch $S_5$ and the sixth switch $S_6$ at a high frequency in a complementary manner, as shown in FIG. 4A. A negative output voltage is produced by operating the inverter in buck-boost mode, during which the sixth switch $S_6$ is kept closed and the fifth switch $S_5$ is kept open, and operating the seventh switch $S_7$ and the eighth switch $S_8$ at high frequency in a complementary manner, as shown in FIG. 4B. The on-times of the high frequency switches in both modes are modulated to achieve the desired output voltage and waveform (e.g., sinusoidal, etc.) The polarity, phase, and frequency of the output voltage ($v_{out}$) can be independent of the input voltage ($v_n$), providing flexibility of operation depending on the load requirements and allowing out-of-phase operation at the AC output.

With reference to FIG. 20, the present disclosure may be embodied as a method 550 for DC-AC power conversion. The method 550 includes providing 553 a first inverter switch in series with a second inverter switch and where. The series first and second inverter switches are connected from a neutral of an AC output to a DC bus. When a reference voltage and/or current is positive, the first inverter switch and the second inverter switch are switched 556, so as to provide a positive component of an AC voltage and/or current on a phase output of the AC output. A third inverter switch is provided 559 in series with a fourth inverter switch. The series third and fourth inverter switches are connected from the phase output to the DC bus. When the reference voltage and/or current is negative, the third inverter switch and the fourth inverter switch are switched 562 so as to provide a negative component of the AC voltage on the phase output.

Control Strategy

The following subsections present exemplary control strategies for the input PFC stage and the output inversion stage of a power converter.

Rectifier Control

Figure 13A:
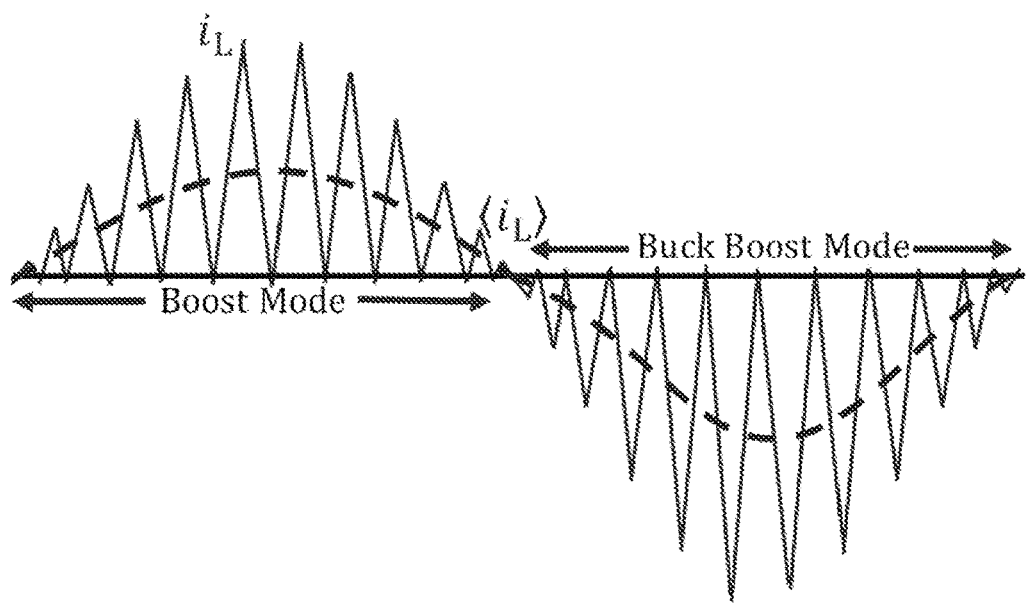
FIG. 13A is a chart showing a time-exaggerated view of inductor current (solid line) and its average value (dashed line) when the rectifier stage is operating in boundary conduction mode control.
Figure 13B:
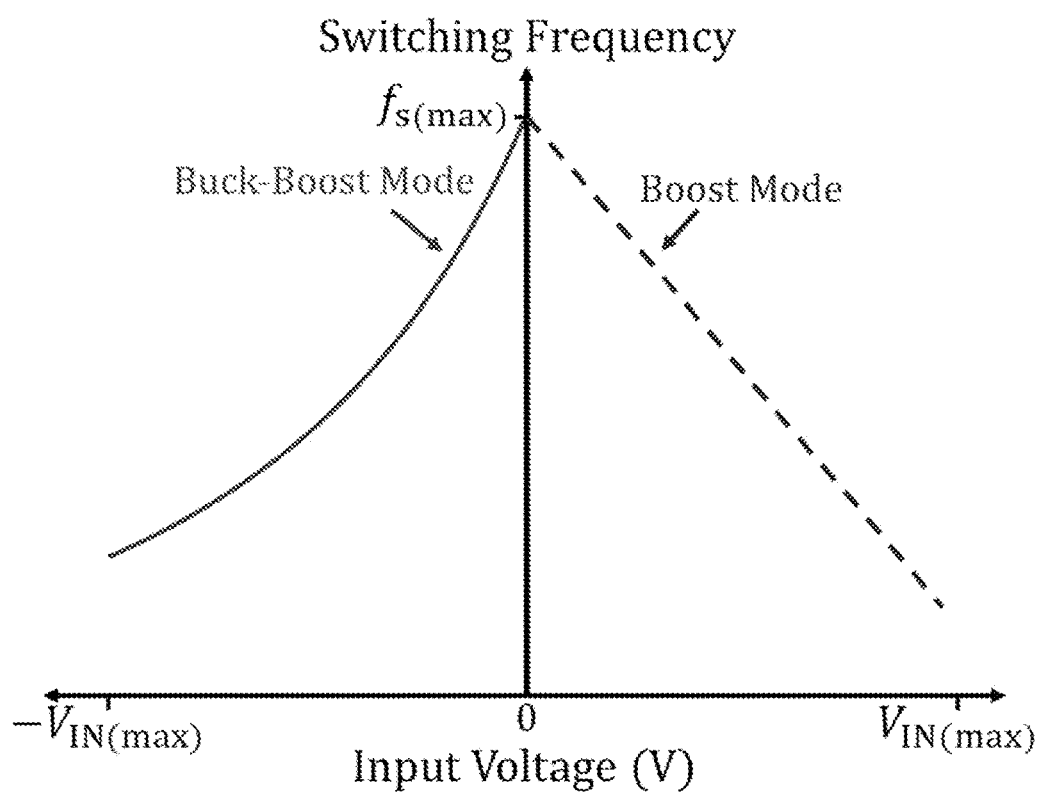
FIG. 13B is a chart showing a variation in switching frequency of the rectifier stage as a function of input voltage, showing where maximum switching frequency ($f_{s(max)}$) occurs.

The input rectification stage of the presently-disclosed power converter is designed to perform PFC operation. In some embodiments, the rectifier operates at high frequency (e.g., MHz-range frequency), which reduces the size of the input inductor ($L_{IN}$), enabling high power density. It may be operated in boundary conduction mode (BCM) control with fixed on-time for the first switch ($S_1$) during the boost mode and variable on-time for the third switch ($S_3$) during the buck-boost mode to achieve unity power factor. FIG. 13A illustrates a time-exaggerated view of the rectifier stage's inductor current ($i_L$) and its average value $\langle i_L \rangle$. As illustrated, the rectifier inductor current reaches a slightly negative value in boost mode and a slightly positive value in buck-boost mode, enabling ZVS. To accomplish this, the switching frequency is varied along the input voltage line cycle. This variation in switching frequency is shown in FIG. 13B. As shown, the switching frequency approaches a maximum value ($f_{s(max)}$) around the zero crossing of the input voltage and is given by:

$$f_{s(max)} = \frac{v_{in,rms}^2}{2L_{IN}P_{OUT}}, \quad (1)$$

where $v_{in,rms}$ is the RMS line voltage, $L_{IN}$ is the rectifier stage inductance and $P_{OUT}$ is the average output power. Equation (1) can be used to optimize the volume and efficiency of the rectifier stage. The required on-times to ensure unity power factor at the AC input of the rectification stage for both the boost and the buck-boost modes are given below:

$$t_{on,boost} = \frac{2L_{IN}}{R_e}, \quad (2)$$

$$t_{on,buckboost} = \frac{2L_{IN}}{R_e}\left(1 + \frac{|v_{IN}|}{V_{BUS}}\right) = t_{on,boost}\left(1 + \frac{|v_{IN}|}{V_{BUS}}\right), \quad (3)$$

where $v_{IN}$ and $v_{BUS}$ are the instantaneous line and the intermediate (DC) bus voltages respectively and Re is the emulated resistance at the AC input of the PFC rectifier stage which is given by:

$$R_e = \frac{v_{in,rms}^2}{P_{OUT}}. \quad (4)$$

A derivation of (1) and (2) is provided below under the heading "On Times for Input Power Factor of the Rectifier Stage."

Figure 14:
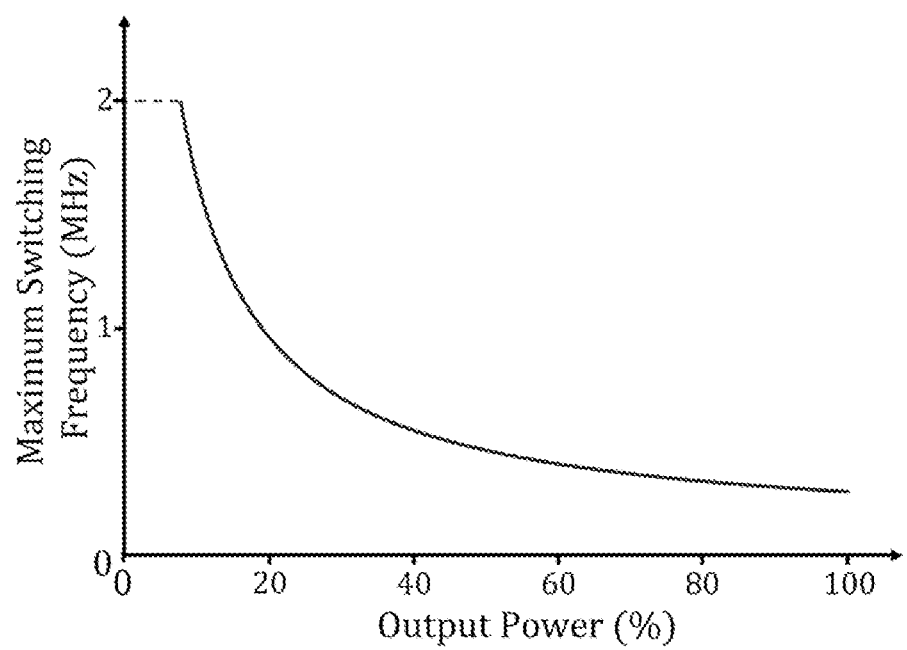
FIG. 14 is a chart showing a variation in maximum switching frequency with output power.

The range of operating frequencies can also be a practical consideration. As can be seen in FIG. 13B, the switching frequency is maximum near the zero-crossings of the input voltage. FIG. 14 shows this maximum switching frequency ($f_{s(max)}$) as a function of output power. The maximum switching frequency $f_{s(max)}$ increases rapidly as load is reduced. To limit the maximum switching frequency to a level achievable by available high-power GaN transistors, in some embodiments, $f_{s(max)}$ is restricted. For example, in some embodiments, $f_{s(max)}$ is restricted to 2 MHz. The minimum switching frequency may be set to ensure soft-switching of the transistors across the entire line cycle while the rectifier is operating at the maximum output power.

Figure 5:
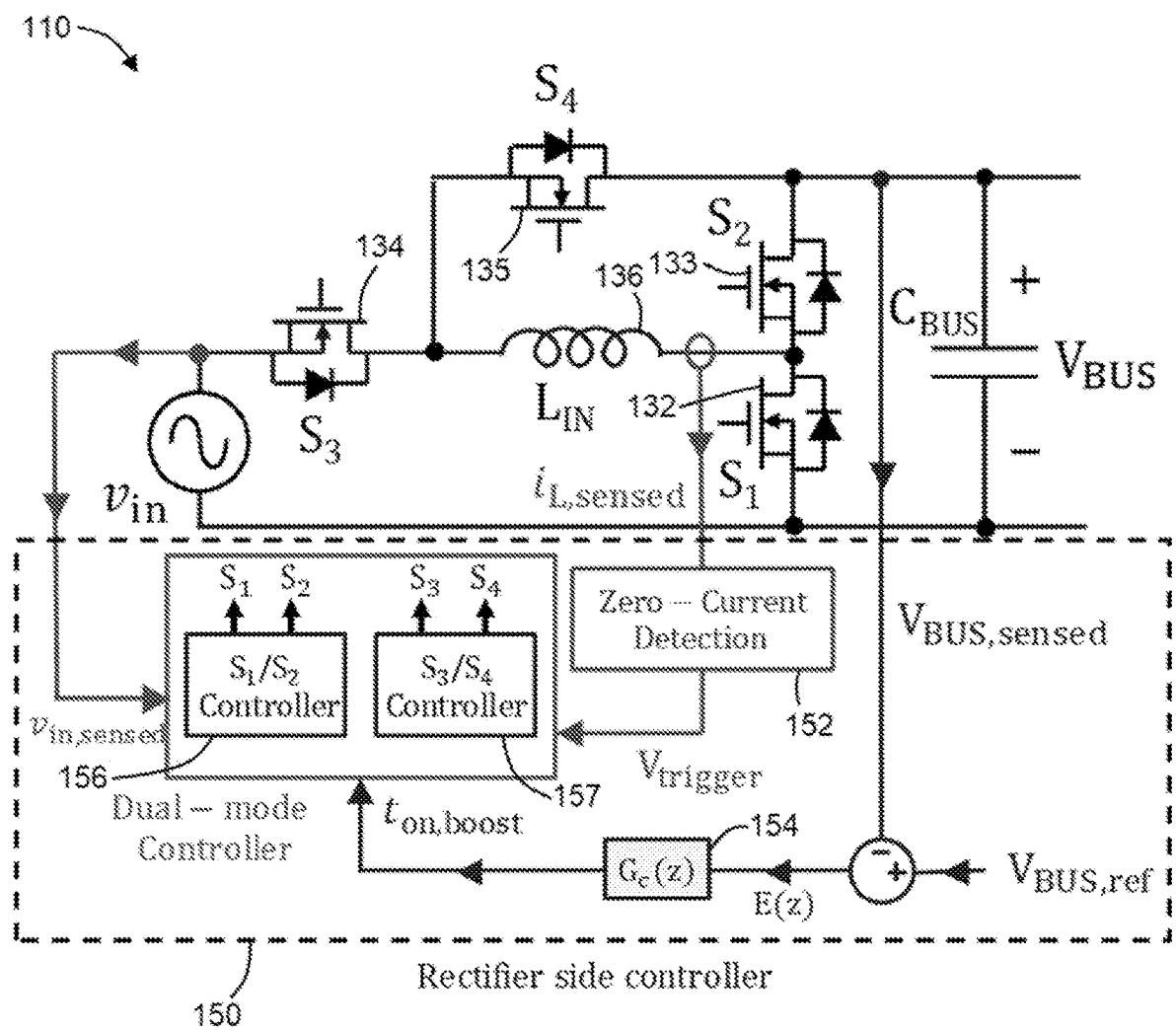
FIG. 5 is a diagram showing a controller architecture for a rectifier stage according to an embodiment of the present disclosure.

An exemplary control architecture for a converter 110 rectifier stage is summarized in FIG. 5. In the exemplary control, A low bandwidth voltage loop is implemented using a compensator 154 having a gain $G_c(z)$. This voltage loop compensator 154 generates an appropriate value of $t_{on,boost}$ (depending on the output load conditions and variations in DC bus voltage). A dual mode controller (including an $S_1/S_2$ controller 156 and $S_3/S_4$ controller 157) is implemented in the rectifier side controller 150. When input voltage is positive, the $S_1/S_2$ controller 156 compares the $Comp_{Boost}$ (corresponding to a $t_{on,boost}$) value to a ramp to generate gate signals for the switches 132 and 133 ($S_1$ and $S_2$ respectively). During this interval the $S_3/S_4$ controller 157 generates an output equal to the maximum ramp amplitude which causes the switch 134 ($S_3$) to stay closed and switch 135 ($S_4$) to stay open. When the input voltage is negative, the $S_3/S_4$ controller 157 generates a $Comp_{Buckboost}$ value (corresponding to a specific $t_{on,buckboost}$ value as given in equation 3) which is then compared with a ramp to generate gate signals for switches 134 and 135 ($S_3$ and $S_4$ respectively). During this interval the $S_1/S_2$ controller 156 generates an output equal to the maximum ramp amplitude which causes the switch 132 ($S_1$) to stay closed and switch 133 ($S_2$) to stay open.

Figure 7A:
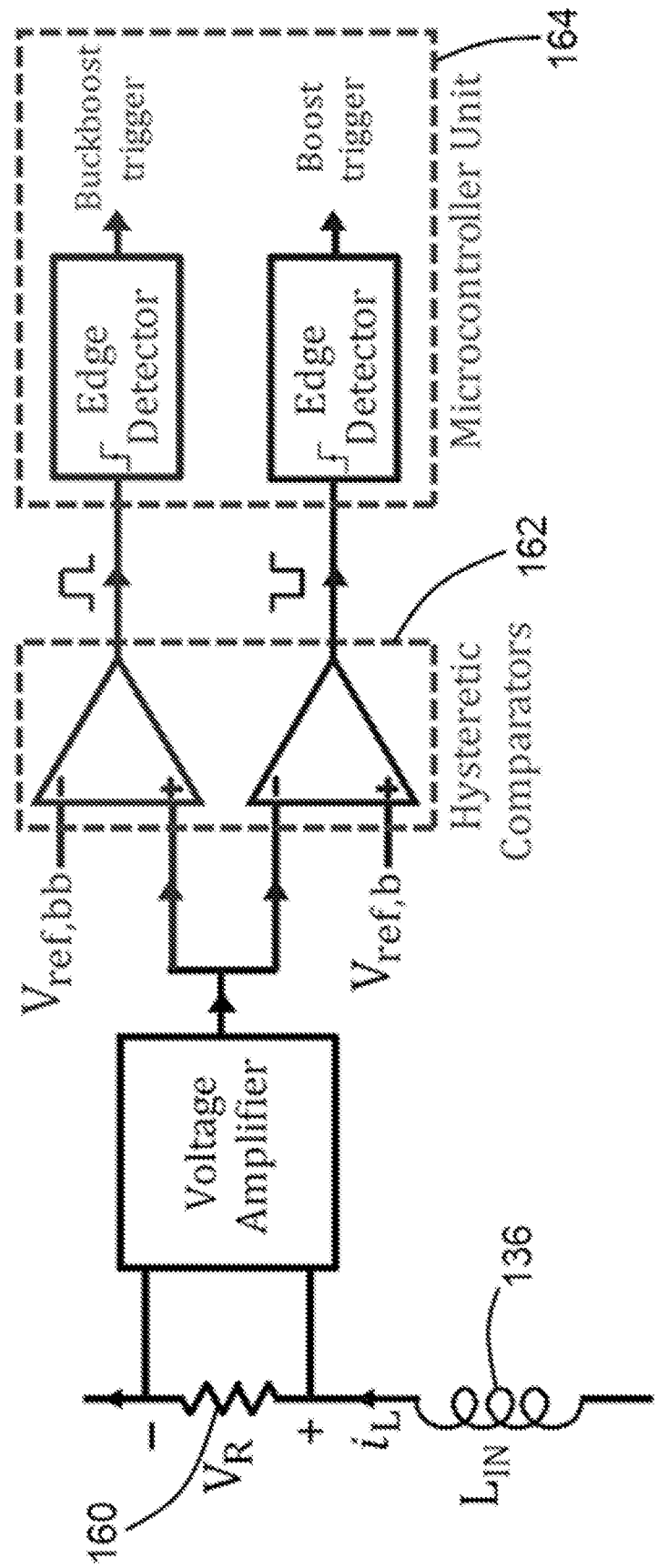
FIG. 7A is a diagram depicting a zero-current detection architecture according to an embodiment of the present disclosure.
Figure 7B:
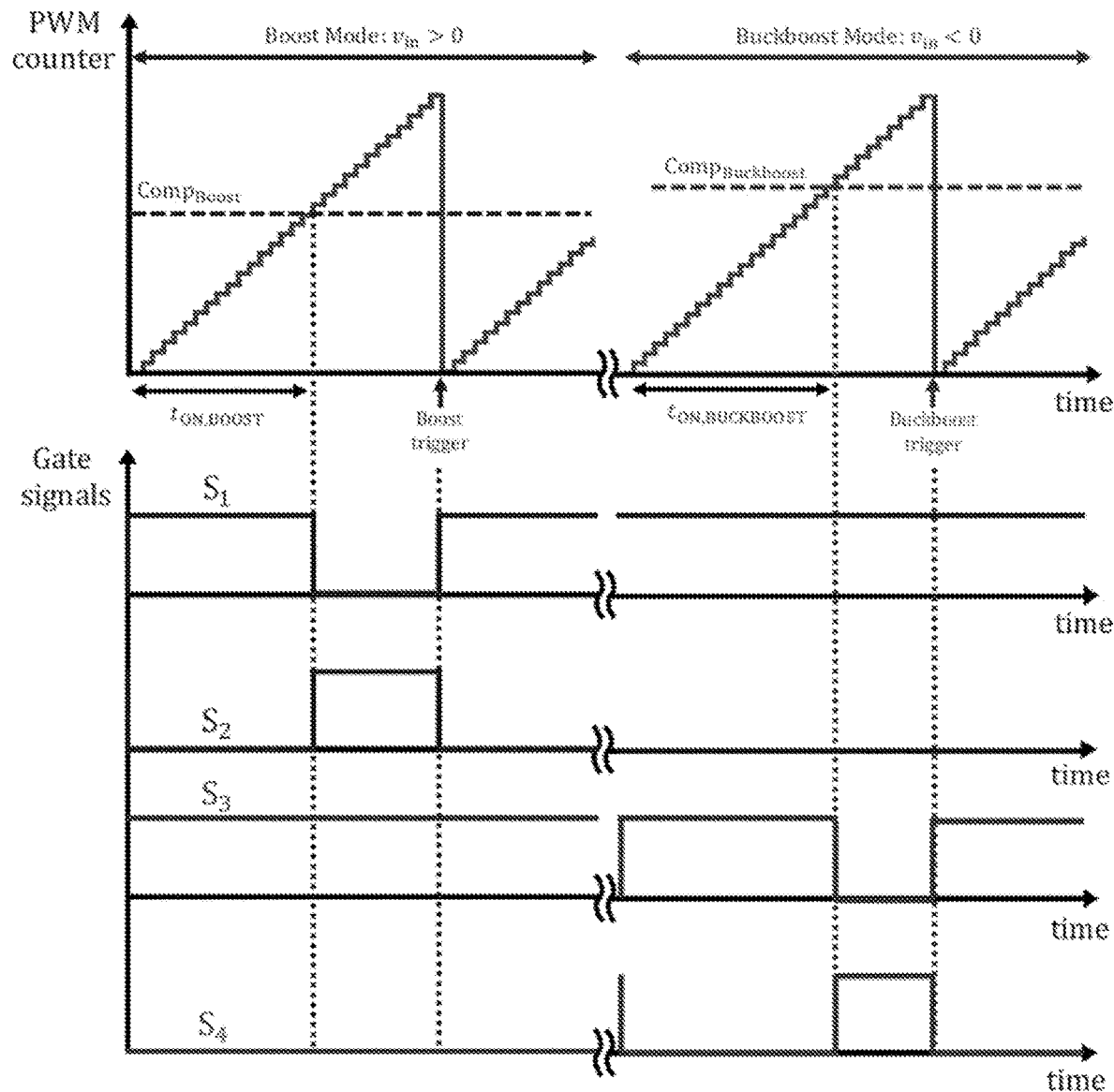
FIG. 7B shows an implementation of variable switching frequency control to provide boundary conduction mode operation of a rectifier stage according to an embodiment of the present disclosure.

In order to provide BCM operation, a zero-current detection (ZCD) circuit 152 is used. This ZCD 152 circuit generates a trigger ($V_{trigger}$) when a current of the input inductor 136 falls below a slightly negative value (when input voltage is positive) and when the input inductor current rises above a slightly positive value (when input voltage is negative). An overview of an exemplary ZCD methodology is shown in FIG. 7A. The voltage drop ($V_R$) across a current sense resistor 160 is amplified and fed into hysteretic comparators 162. The outputs of these comparators are then fed into a microcontroller 164 which utilizes edge detectors (which may be built in to the microcontroller) to generate trigger signals. FIG. 7B shows the operation of the microcontroller PWM generation module. The trigger signals are used to reset the PWM counter which trips the appropriate synchronous switches and consequently start the next switching cycle. Thereby dynamically varying the switching frequency to operate in boundary conduction mode. Furthermore, ZVS is provided by assigning a suitable deadtime in the PWM generation module of the microcontroller unit.

Figure 8:
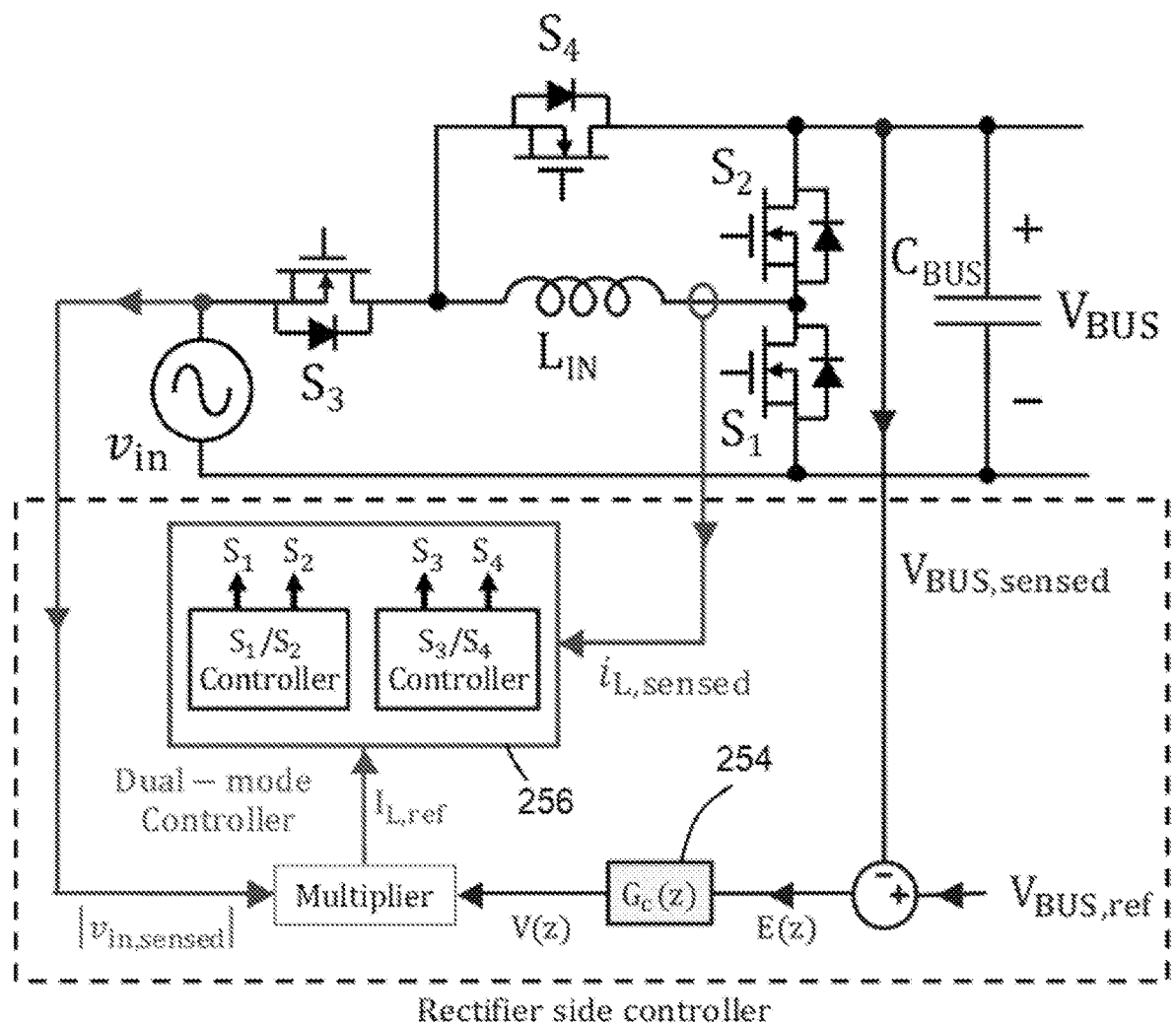
FIG. 8 depicts a rectifier control architecture according to another embodiment of the present disclosure.

FIG. 8 shows an alternative rectifier control approach having a control architecture suitable for a hard-switched PFC rectifier stage. In the embodiment of FIG. 8, an output from a voltage loop compensator 254 is multiplied with the instantaneous magnitude of the AC input voltage which generates an inductor current reference for a dual-mode controller 256. The dual-mode controller 256 utilizes the error between the inductor current reference and a sensed instantaneous inductor current to generate the appropriate gate signals for switches $S_1$ through $S_4$.

Inverter Control

An inverter stage may be used to produce a high quality AC voltage at an AC output of the power converter. The inverter stage may be controlled by, for example, a voltage mode controller that regulates the AC output voltage across varying output loads and low frequency bus voltage oscillations.

A voltage control loop may be used for the inverter stage of the power converter. This control strategy may use a constant frequency duty-cycle control methodology to generate a sinusoidal voltage at the AC output of the inverter. The relationship of the AC output voltage of the inverter stage ($v_{out}$) with the bus voltage ($V_{BUS}$) is that of a buck converter (for $v_{out}>0$) and a buck-boost converter (for $v_{out}<0$), operated in continuous conduction mode (CCM) as given by:

$$\begin{bmatrix} v_{out} = d_{buck} V_{BUS} & \text{for } v_{out} > 0 \\ v_{out} = \frac{-d_{buckboost}}{1 - d_{buckboost}} V_{BUS} & \text{for } v_{out} < 0 \end{bmatrix} \quad (5)$$

where $d_{buck}$ and $d_{buckboost}$ are the duty cycles of the active switches (fifth switch $S_5$ and seventh switch $S_7$) in buck mode and buck-boost mode of inverter operation. The inverter can be operated either in a hard-switching mode or in a soft-switching mode.

Figure 6:
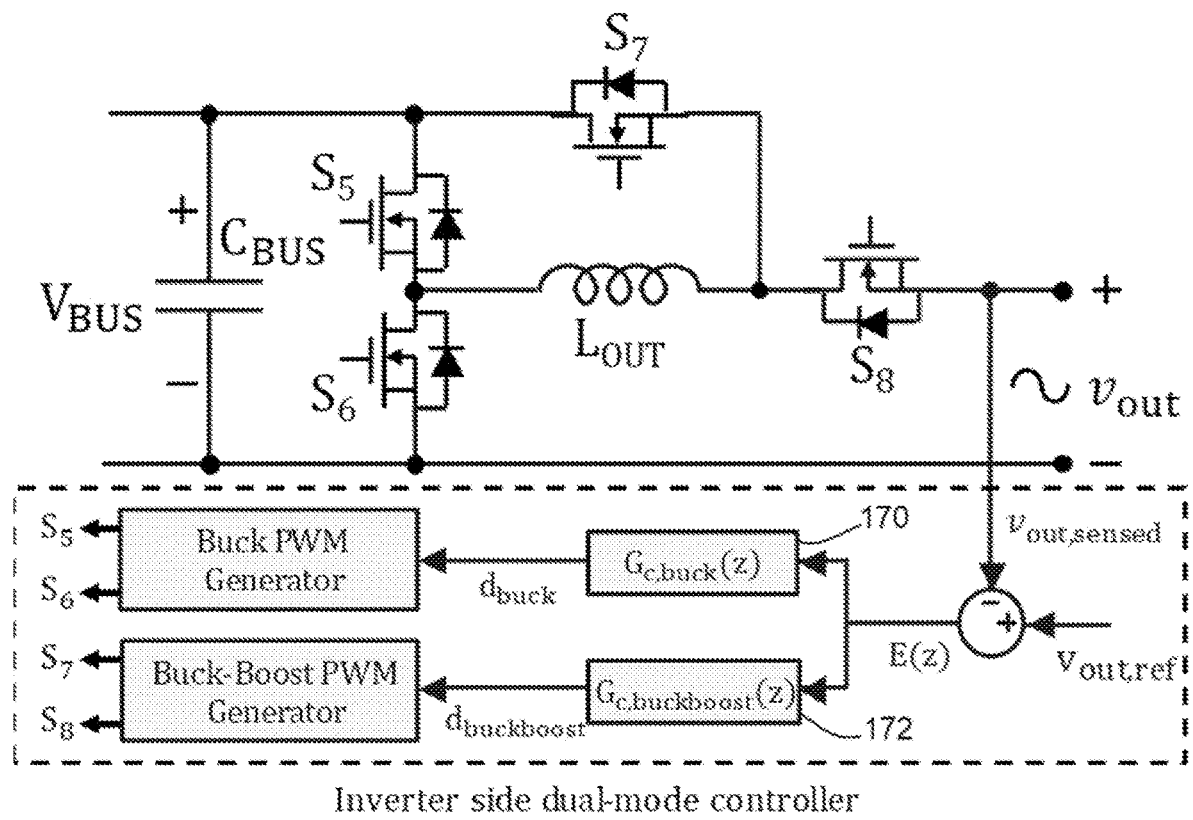
FIG. 6 is a diagram of showing a controller architecture for a rectifier stage according to an embodiment of the present disclosure.

An exemplary dual-mode control architecture for the inverter stage is shown in FIG. 6. The error between the instantaneous output AC voltage ($v_{out}$) and a reference sine wave ($v_{out,ref}$) is fed into two compensators: the buck compensator 170 ($G_{c,buck}$) and the buck-boost compensator 172 ($G_{c,buckboost}$). When the required output voltage is positive, the buck compensator 170 generates a signal which is compared with a ramp in the buck PWM generator which produces appropriate gate signals for the switches $S_5$ and $S_6$. During this interval the buck-boost compensator 172 produces a value equal to the maximum threshold of the ramp in buck-boost PWM generator thereby causing $S_8$ to stay closed and $S_7$ to stay open. When the required output voltage is negative, the buck-boost compensator 172 generates a signal which is compared with a ramp in the buck-boost PWM generator which produces appropriate gate signals for the switches $S_7$ and $S_8$. During this interval the buck compensator 170 produces a value equal to the maximum threshold of the buck PWM generator thereby causing $S_6$ to stay closed and $S_5$ to stay open. Although this architecture is described as using two compensators, a single compensatory may be used in a similar manner for both buck and buck-boost.

Uninterruptible Power Supply (UPS) Embodiments

The presently-disclosed converter topology can interface with a battery (and/or another energy storage device) for use as a UPS, including by utilizing the PFC rectifier stage for both battery charging and battery-mode operation. UPS systems can be classified as offline, line-interactive, or online. When power from the line (i.e., the AC input) is available, offline and line-interactive systems provide power directly from the AC input to the loads connected to the AC output. Online UPS systems (also referred to as double-conversion systems) process and condition all the power from the AC input to provide power to the AC output.

Figure 9:
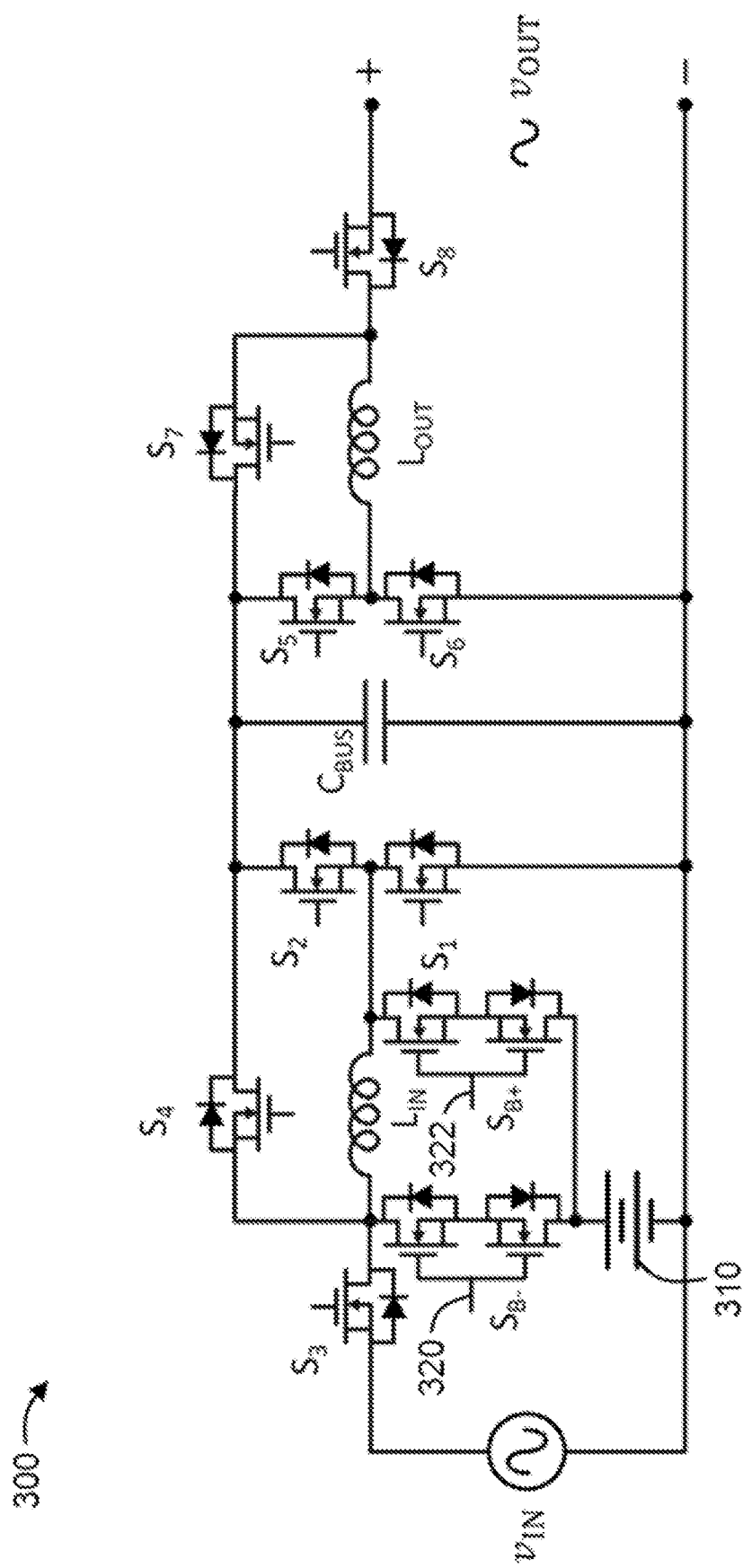
FIG. 9 is a diagram showing a UPS topology according to another embodiment of the present disclosure, and having two four-quadrant switches ($S_{B-}$ and $S_{B+}$) to interface with a battery. The extra circuitry enables full line-cycle battery charging, as well as battery-mode operation.

The presently-disclosed converter topology can interface with a battery for use as an online UPS in different ways. FIG. 9 shows a first UPS topology 300 where a battery 310 is interfaced with the converter topology of FIG. 2. In this case, the interface is provided by the addition of a first four-quadrant switch 320 ($S_{B-}$) and a second four-quadrant switch 322 ($S_{B+}$), and no additional inductor is required. The UPS topology with the provided battery interface can charge the battery in both the positive and the negative half line-cycles while also delivering power to the loads; and it can power the loads when power is not available from the line. The control of the switches in the battery charging mode and in the battery-mode operation (i.e., battery discharging mode) is described below.

Battery Charging Mode: The battery can be charged when power is available from the line, and in this mode the PFC rectifier stage in conjunction with the battery interface operates as a single-input dual-output converter. The control of the switches in the battery charging mode depends on whether the line voltage is positive or negative. During the negative half line-cycle, switch $S_1$ is kept closed and switches $S_2$ and $S_{B+}$ are kept open, while the other switches are closed and opened in a specific sequence (at a desired switching frequency): first switch $S_3$ is closed (and $S_4$ and $S_{B-}$ opened) to allow inductor $L_{IN}$ to build up stored energy; then $S_4$ is closed and $S_3$ opened (with $S_{B-}$ still open) to transfer part of the inductor energy to the DC-bus; and then $S_{B-}$ is closed and $S_4$ opened (with $S_3$ still open) to charge the battery. This cycle is repeated throughout the negative half line-cycle, and the time durations for which each switch conducts is controlled so as to maintain the DC-bus voltage, the charging rate of the battery, and the shape of the input current waveform. During the positive half line-cycle, switch $S_3$ is kept closed and switches $S_4$ and $S_{B-}$ are kept open, while the other switches are closed and opened in a specific sequence (at a desired switching frequency): first switch $S_1$ is closed (and $S_2$ and $S_{B+}$ opened) to allow inductor $L_{IN}$ to build up stored energy; then $S_2$ is closed and $S_1$ opened (with $S_{B+}$ still open) to transfer part of the inductor energy to the DC-bus; and then $S_{B+}$ is closed and $S_2$ opened (with $S_1$ still open) to charge the battery. This cycle is repeated throughout the positive half line-cycle, and the time durations for which each switch conducts is controlled so as to maintain the DC-bus voltage, the charging rate of the battery, and the shape of the input current waveform.

Battery Discharging Mode: When the line is not available to deliver power to the load, the power must be delivered from the battery. In this battery mode, switch $S_3$ is opened to disconnect the line from the UPS and switch $S_{B-}$ is closed to connect the battery to the UPS input. Switches $S_4$ and $S_{B+}$ are also kept open during this mode. Switches $S_1$ and $S_2$ are switched in a complementary manner with an appropriately controlled duty ratio (and dead time) to create a steady positive voltage across the DC bus formed by $C_{BUS}$ through boost mode of operation utilizing inductor $L_{IN}$.

Figure 10:
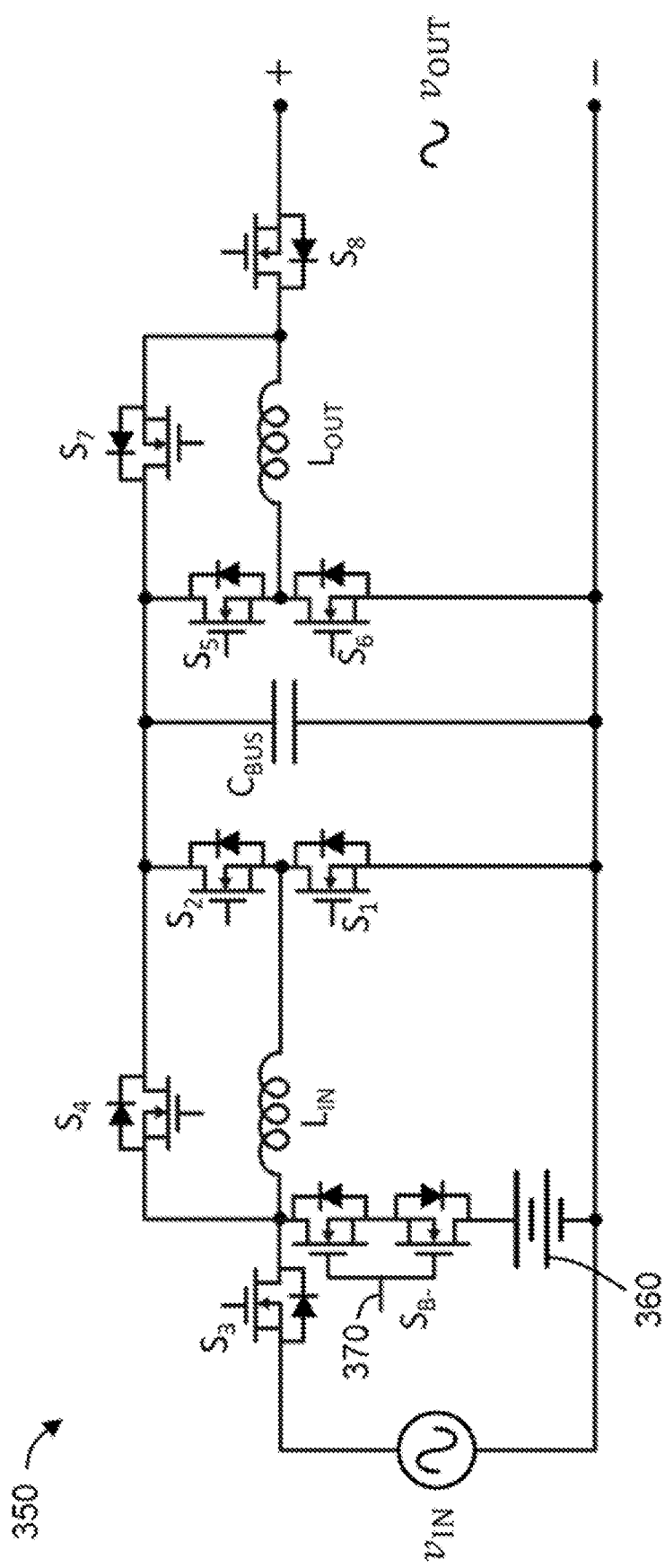
FIG. 10 is a diagram showing a UPS topology according to another embodiment of the present disclosure, and one four-quadrant switches ($S_{B-}$) to interface with a battery. The extra circuitry enables half line-cycle battery charging, as well as battery-mode operation. The battery can be charged in the negative half-cycle but not in the positive half-line cycle.

Single Four-Quadrant Switch Interface: In another embodiment of a UPS 350, a battery 360 is interfaced with a converter as shown in FIG. 10. In this case, the battery 360 is interfaced with the converter using a single four-quadrant switch (first four-quadrant switch 370 ($S_{B-}$)). This still enables both battery charging and battery-mode operation without the addition of an extra inductor (instead the inductor of the PFC rectifier stage is reused for these operations). However, unlike the topology of FIG. 9, this variant only allows the battery to be charged during the negative half-cycle of the line. In this topology, the battery cannot be charged during the positive half-line cycle.

Figure 11:
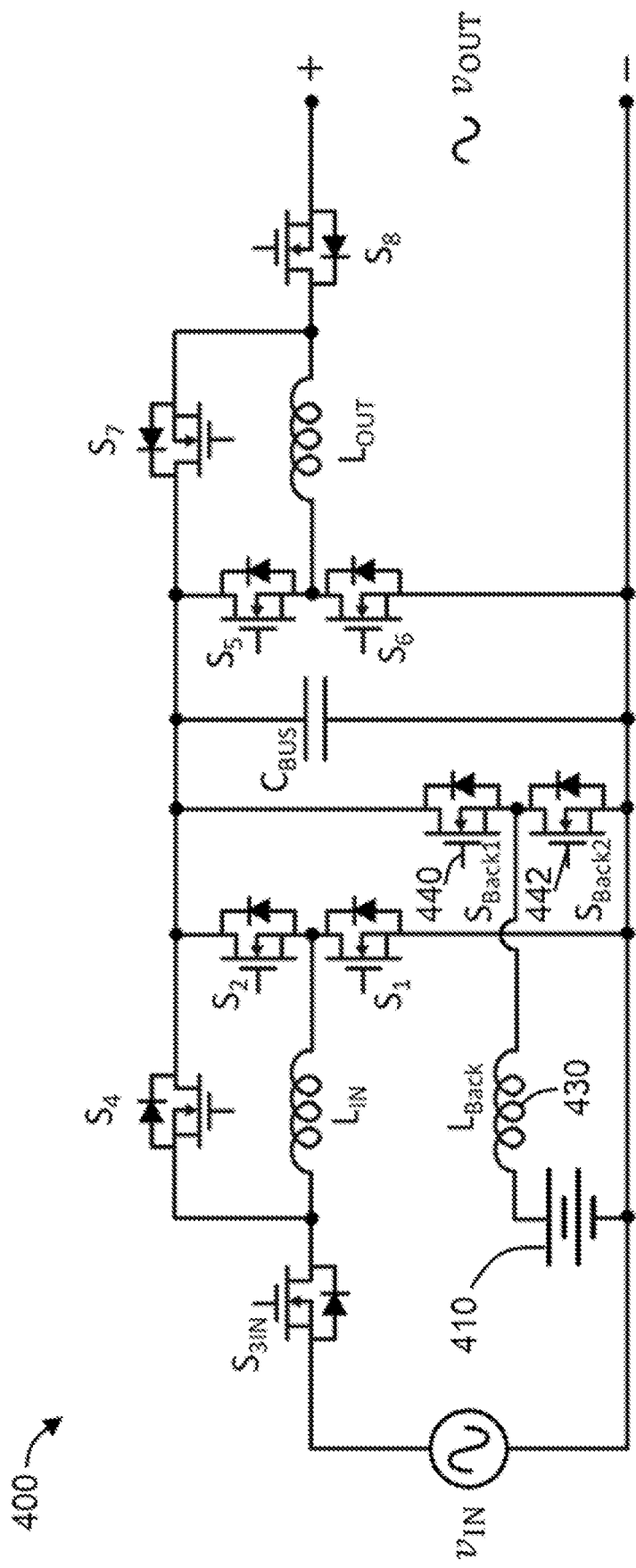
FIG. 11 is a diagram showing a UPS topology according to another embodiment of the present disclosure, and having a full power rating bi-directional DC-DC converter to interface with a battery.

Bi-directional DC-DC Converter Interface: In another embodiment of a UPS 400, a battery 410 is interfaced with a converter as shown in FIG. 11. This utilizes an additional bi-directional DC-DC converter (formed by first backup switch 440 ($S_{Back1}$), second backup switch 442 ($S_{Back2}$), and backup inductor 430 ($L_{Back}$)) for both battery charging and battery-mode (battery discharging) operation. This example uses only half-bridge switch structures (which are compatible with high frequency operation) in the circuitry used to interface the converter with the battery. However, it does require the use of an extra inductor; and since the extra DC-DC converter is also used for battery mode operation, this DC-DC converter has to be sized for the full power rating of the UPS.

Figure 12:
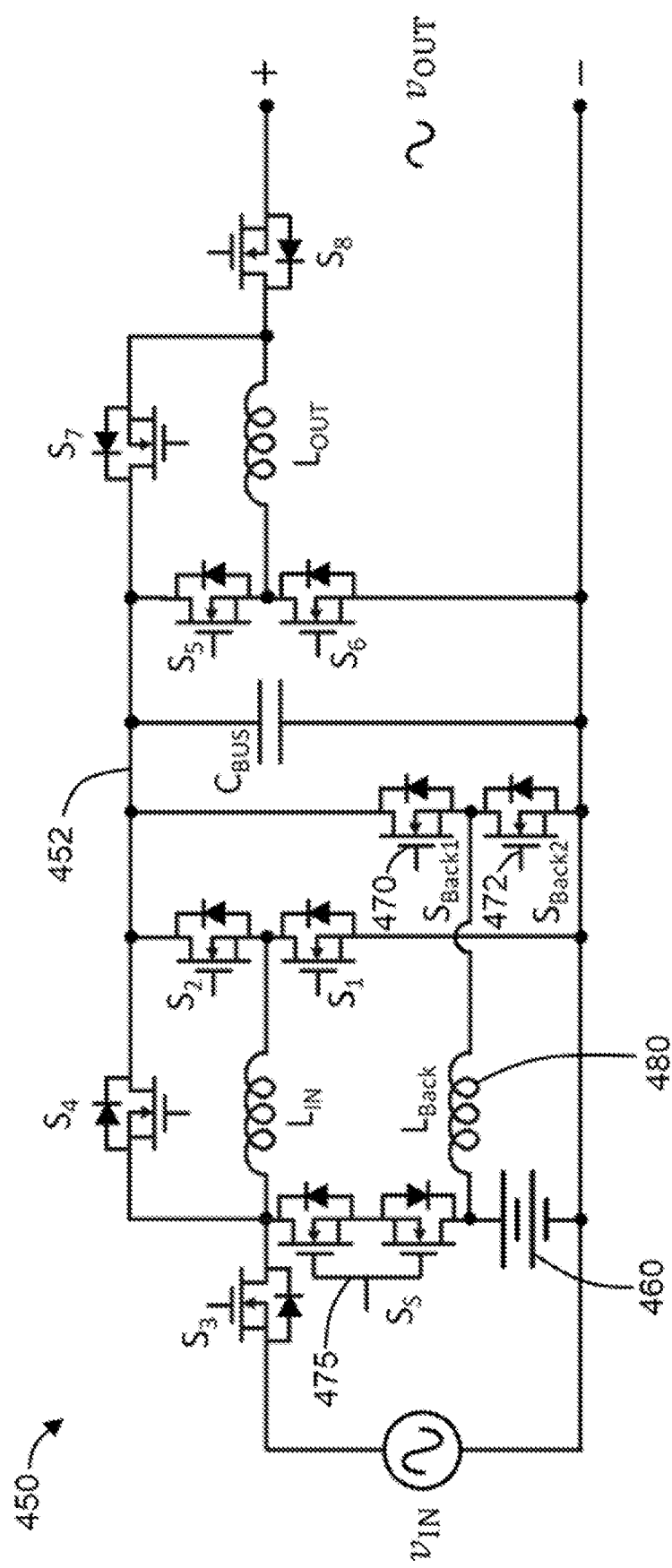
FIG. 12 is a diagram showing a UPS topology according to another embodiment of the present disclosure, and having a lower power rating (and possibly unidirectional) battery charger (relative to the topology of FIG. 11) and a static switch converter to interface with the UPS battery.

Static Switch and Low-Power-Rating DC-DC Converter Interface: In another embodiment of a UPS 450, a battery 460 is interfaced with a converter as shown in FIG. 12. In this case, a lower power unidirectional DC-DC converter (formed by first backup switch 470 ($S_{Back1}$), second backup switch 472 ($S_{Back2}$), and backup inductor 480 ($L_{Back}$)) is used to charge the battery 460 from the DC-bus 452, while a four-quadrant static switch 475 ($S_S$) is used to interface the battery to the UPS during battery-mode (battery discharging) operation. When the UPS goes into battery-mode operation, the static switch simply turns on and does not switch on/off repeatedly. Since the static switch does not have to switch at high frequencies, it can be a mechanical or solid-state relay. Hence, this UPS topology 450 also only uses half-bridge switch structures to accomplish all high-frequency switching. Also, since the DC-DC converter is only used to charge the battery (which can be done over a relatively long time period), the power rating of the DC-DC converter can be much lower than the power rating of the UPS. This enables the battery interface shown in FIG. 12 to be substantially smaller than the battery interface shown in FIG. 11.

Design Methodology

Figure 17:
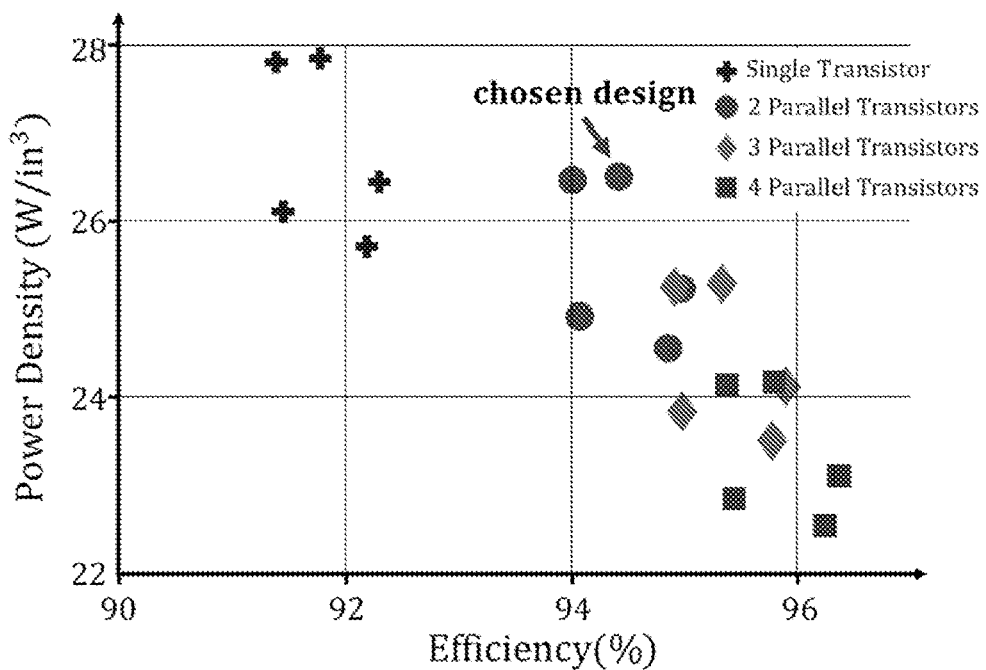
FIG. 17 is a chart showing results for optimization of power density and efficiency of the online UPS considering various design options.

A design methodology is developed that selects an advantageous trade-off between power density and efficiency of the proposed converter by estimating losses and size based on a given set of design parameters. A loss model for the converter is developed by considering the conduction losses in its switches, core and winding losses in its inductors, and equivalent series resistor (ESR) loss in the DC bus capacitor. The most dominant loss mechanism is the conduction loss in the converter switches. This is due to operation of the rectifier stage in boundary conduction mode which results in higher peak and RMS currents in the rectifier switches. Similarly, a low inductance value for the inverter stage (to enhance power density) also results in higher peak and RMS switch currents which further contributes to the conduction losses in the inverter switches. Furthermore, a majority of the conduction loss is divided amongst the first switch $S_1$, third switch $S_3$, sixth switch $S_6$, and eighth switch $S_8$, which conduct throughout the line cycle, while the remaining synchronous switches conduct only during a half-line cycle. The conduction losses in the switches that conduct across the full line cycle can be reduced by realizing them using multiple paralleled transistors. However, paralleling multiple transistors increases board area and adversely affects power density. Another major factor affecting the power density is the size of the inductor cores (input inductor and output inductor). The total volume of exemplary converters and their corresponding losses are estimated for different numbers of parallel transistors and inductor core sizes in FIG. 17. As can be seen in the figure, designs with higher power densities result in lower efficiencies. As a reasonable trade-off between power density and efficiency, a design option having 2 parallel transistors, was selected for a prototype design presented below. The design utilized an RM-14 ferrite core for the input and output inductors and utilized two paralleled GaN transistors for each of the switches in the exemplary converter.

Prototype Design and Experimental Results

Figure 15:
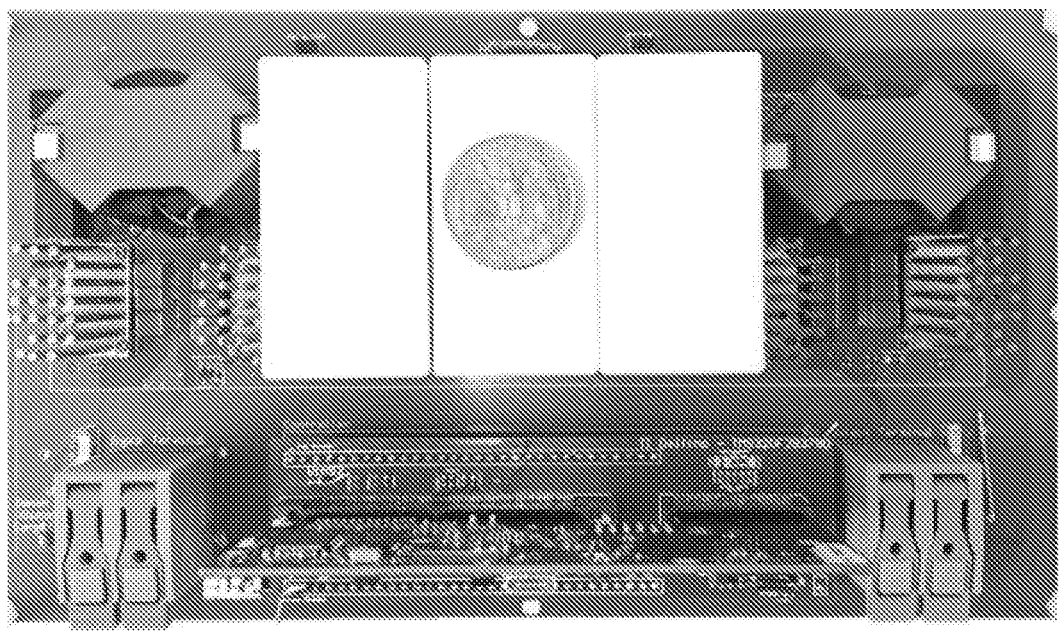
FIG. 15 is a photograph of a prototype 1-kVA power converter which operated at switching frequencies of up to 2 MHz and achieved a power density of 26.4 W/in³.

A 1-kVA prototype of a power converter was designed, built, and tested according to an embodiment of the present disclosure. A photograph of the prototype is shown in FIG. 15. The exemplary converter was designed to be operated at input and output AC voltages of 120 Vrms. The switches $S_1$ through $S_8$ were realized using 650-Volt, 30-Amp eGaN transistors (GaN Systems GS66508T). The input and output inductors $L_{IN}$ and $L_{OUT}$ were realized using Litz wire on RM-14 ferrite cores. The capacitor $C_{bus}$ was implemented using 450-Volt film capacitors. The closed loop control for both rectifier and inverter stages was performed using a TI 200-MHz, 32-bit microcontroller, in conjunction with an inductor current zero crossing detection (ZCD) circuit that enables boundary conduction mode operation of the converter. The ZCD circuitry utilized a 10-mΩ current sense resistor in series with $L_{IN}$, a high-bandwidth voltage amplifier circuit (e.g., 345-MHz output amplifier), and hysteresis-based comparator circuit for ZCD signal generation. The exemplary converter had a box volume of 37.8 inch$^3$ and achieved a power density of 26.4 W/inch$^3$.

Figure 16A:
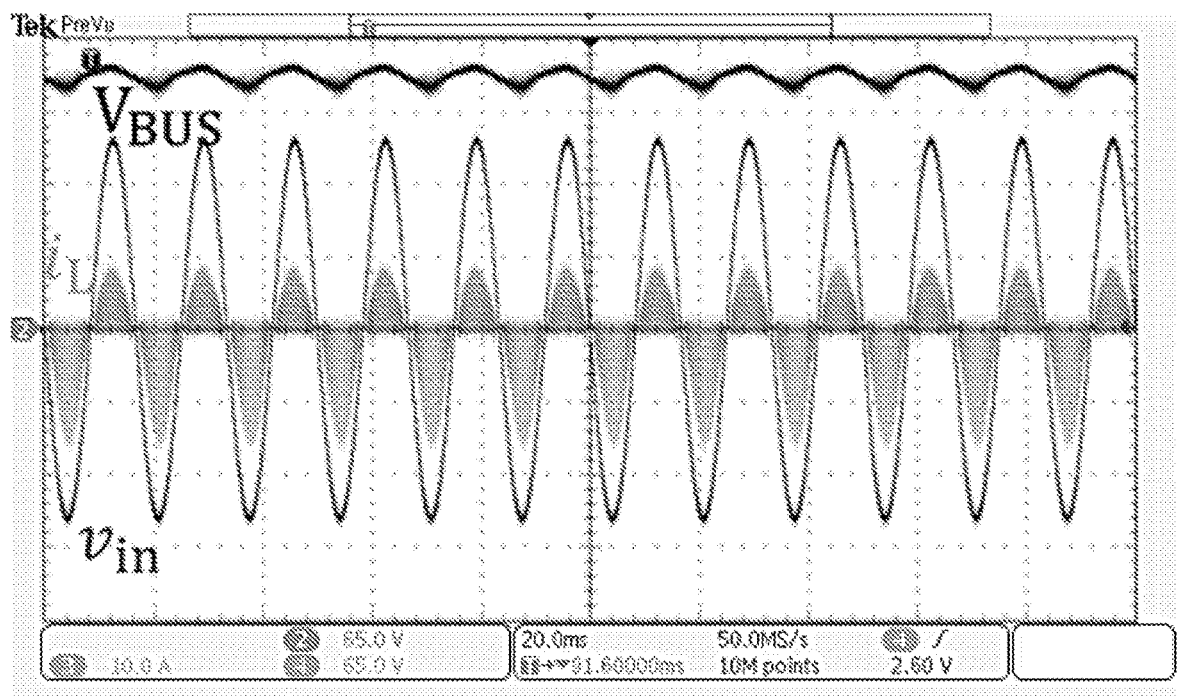
FIG. 16A is a chart showing input voltage, inductor current, and bus voltage of the rectifier stage of the prototype of FIG. 15 demonstrating boundary conduction mode control.
Figure 16B:
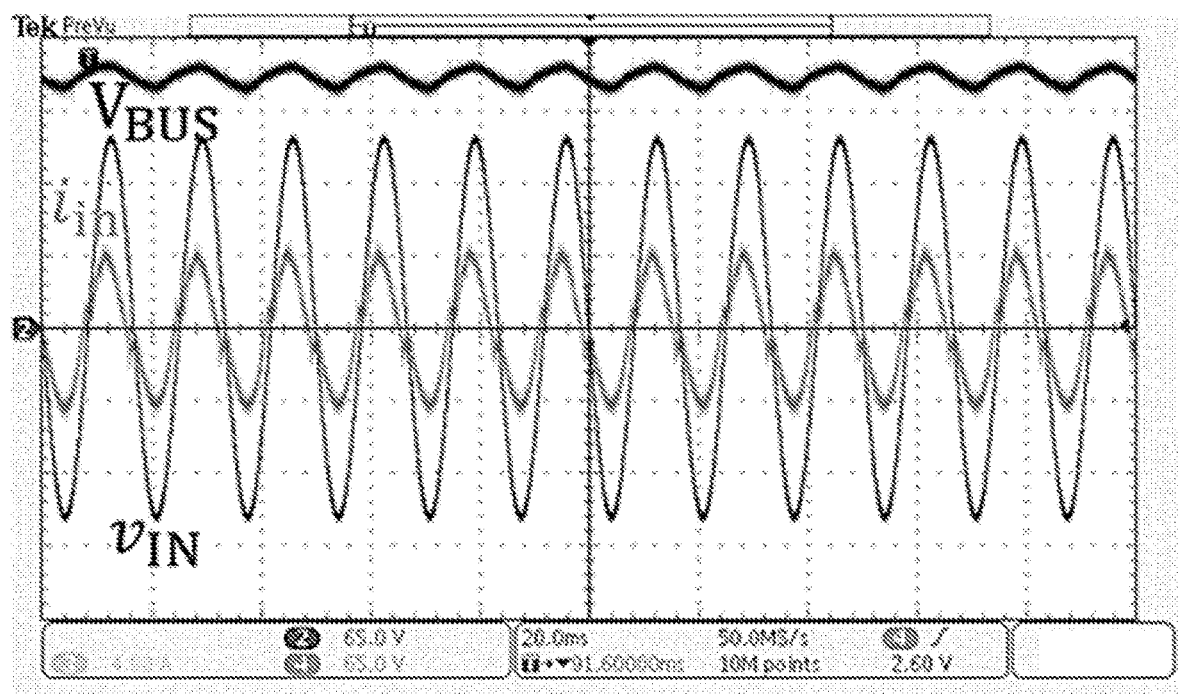
FIG. 16B is a chart showing input voltage, input current and bus voltage of the rectifier stage of the prototype of FIG. 15 demonstrating unity power factor at the input.
Figure 16C:
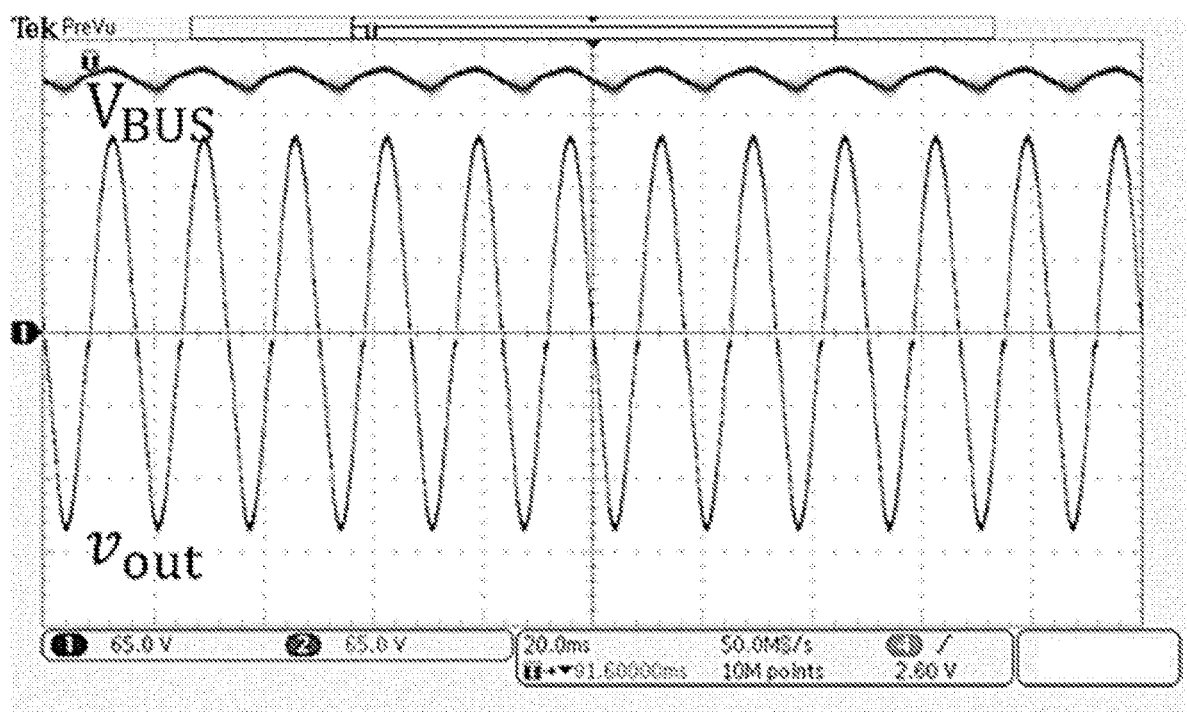
FIG. 16C is a chart showing bus voltage and output voltage of the inverter of the prototype of FIG. 15 utilizing the output voltage mode control strategy, while the converter is operating in online mode.
Figure 18:
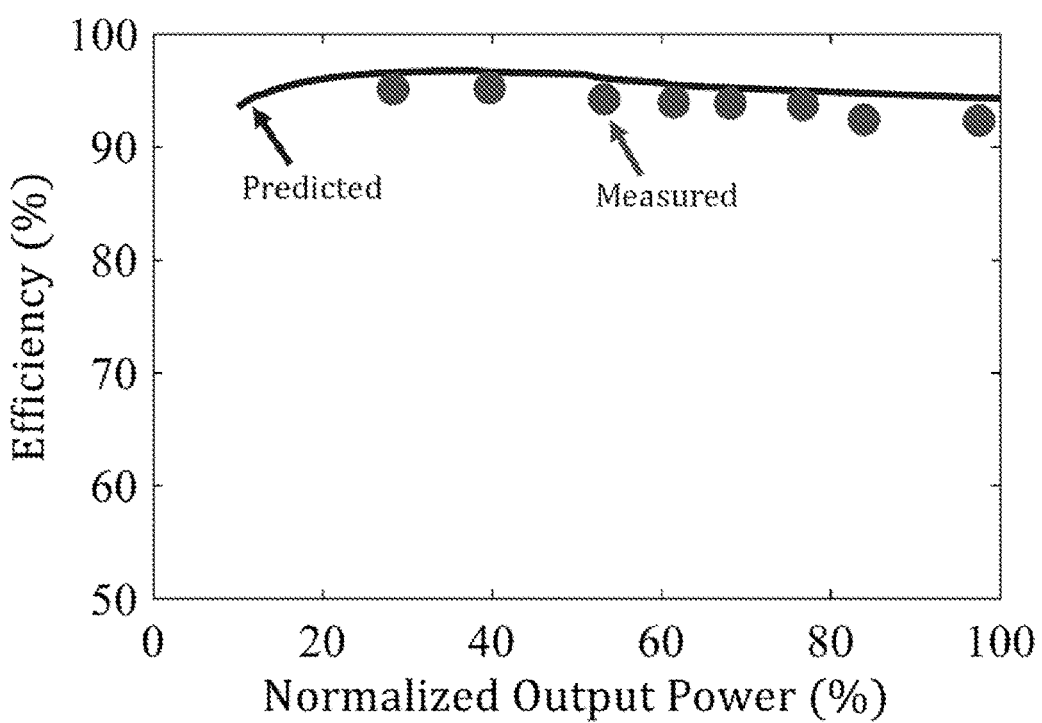
FIG. 18 is a chart showing predicted and experimentally measured efficiency of the online UPS as a function of normalized output power.

FIGS. 16A-16C show the experimentally measured waveforms of the online UPS while operating in online mode. FIG. 16A shows the AC input voltage, (input) inductor current, and DC bus voltage for the rectifier stage while the rectifier operated in boundary conduction mode. As can be seen, the input inductor current approaches a slightly negative value in boost mode (during positive input voltage half-cycle) and slightly positive value (during negative input voltage half-cycle), allowing ZVS in high-frequency switches. FIG. 16B shows the steady state AC input voltage, AC input current, and DC bus voltage. The input current of the online UPS was sinusoidal and in-phase with the input voltage, demonstrating PFC operation. FIG. 16C shows the steady state AC output voltage of the inverter stage. As can be seen, the inverter generated an output voltage of the same frequency and amplitude as the input voltage, validating the output voltage mode control and verifying suitability for use as part of an online UPS. It can be seen that the converter operated with a high input power factor and a low total harmonic distortion (THD) output sinusoidal waveform, thus verifying the control methods described herein. Furthermore, FIG. 18 shows the predicted and measured efficiencies of the exemplary converter as a function of normalized output power. The exemplary converter achieved a high peak efficiency of over 95.2% and a full load efficiency in excess of 92%.

Although power MOSFETs are shown throughout the present disclosure, other appropriate switches, including (but not limited to) superjunction MOSFETs, high electron mobility transistors (HEMTs), insulated gate bipolar transistors (IGBTs), bipolar junction transistors (BJTs), diodes, thyristors, and relays, can also be utilized. In some embodiments, wide bandgap semiconductor devices, such as, for example, Silicon Carbide (SiC) and Galium Nitride (GaN) semiconductor devices, may be used instead of devices based on, for example, Silicon. The various conversion stages can be operated either in a hard-switching mode or in a soft-switching mode. The disclosed converter topologies can also be used with different control techniques for PFC rectifier operation (including, but not limited to, average current mode control and peak current mode control), DC bus regulation, battery charging, battery discharging, and inverter output voltage (or current) regulation. These may include, but are not limited to, average and peak current mode control, sine pulse width modulation (SPWM), space vector pulse width modulation (SVPWM), and other modes that utilize embodiments of the circuit topology. The presently-disclosed approach can be extended to three-phase systems (e.g., three-phase UPS systems) with direct extension of the topology. The same approach can also be extended to drives (e.g., variable-frequency drives) for motor and generator controls.

The presently-disclosed AC-AC converter topology can also be operated as a bi-directional converter (with power flowing either from the input port to the output port, or from the output port to the input port). Furthermore, the AC-DC or the DC-AC stage can be used individually as bi-directional converters.

Suitable controllers may be digital, analog, or a combination of digital and analog. For example, a digital controller may be or may include a processor. An analog controller may be or may include one or more analog components/circuits such as, for example, comparators, op-amps, compensators, etc. A controller may be in communication with and/or include a memory. The memory can be, for example, a random-access memory (RAM) (e.g., a dynamic RAM, a static RAM), a flash memory, a removable memory, and/or so forth. In some instances, instructions associated with performing the operations described herein can be stored within the memory and/or a storage medium (which, in some embodiments, includes a database in which the instructions are stored) and the instructions are executed at the controller.

In some instances, the controller includes one or more modules and/or components. Each module/component executed by the controller can be any combination of hardware-based module/component (e.g., a field-programmable gate array (FPGA), an application specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the controller is capable of performing one or more specific functions/operations as described herein. In some instances, the modules/components included and executed in the controller can be, for example, a process, application, virtual machine, and/or some other hardware or software module/component. The controller can be any suitable controller configured to run and/or execute those modules/components. The controller can be any suitable processing device configured to run and/or execute a set of instructions or code. For example, the controller can be a general purpose processor, a central processing unit (CPU), an accelerated/arithmetic processing unit (APU), a field-programmable gate array (FPGA), an application specific integrated circuit (ASIC), a digital signal processor (DSP), and/or the like.

Some instances described herein relate to a computer storage product with a non-transitory computer-readable medium (which can also be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other instances described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, instances may be implemented using Java, C++, NET, or other programming languages (e.g., object-oriented programming languages) and development tools. Additional examples of computer code include, but are not limited to, control signals, encrypted code, and compressed code.

On Times for Input Power Factor of the Rectifier Stage

This appendix provides the derivation for the required on-times to ensure unity power factor at the input of the rectification stage operating in BCM. For a unity input power factor, the input of the rectifier must emulate a resistance (Re) given be (4). The average input current of the rectifier is then given by:

$$\langle i_{in} \rangle = \frac{v_{in}}{R_e}, \quad (6)$$

For boost mode, the inductor current would rise to twice the average input current. With input voltage ($v_{in}$) appearing across the input inductor ($L_{IN}$), the on-time for inductor current ($i_L$) to reach the maximum value is given by:

$$t_{on,boost} = \frac{2\langle i_{in} \rangle L_{IN}}{v_{in}} = \frac{2L_{in}}{R_e}, \quad (7)$$

Similarly, for the buck-boost mode, the inductor current would rise to twice the average inductor current $\langle i_L \rangle$ given by:

$$\langle i_L \rangle_{buckboost} = \frac{\langle i_{in} \rangle}{d_{buckboost,PFC}}, \quad (8)$$

Where $i_{L,buckboost}$ is the inductor current in rectifier buck-boost mode and $d_{buckboost,PFC}$ is the duty-cycle of rectifier switch $S_3$. In BCM, this duty-cycle is given by:

$$d_{buckboost,PFC} = \frac{V_{BUS}}{V_{BUS} + |v_{in}|} \quad (9)$$

The peak inductor current in buck-boost mode would rise to twice the average inductor current given by:

$$\langle i_L \rangle_{buckboost,PFC} = \frac{2|v_{in}|}{R_e}\left(\frac{V_{BUS} + |v_{in}|}{V_{BUS}}\right), \quad (10)$$

The on-time for buck-boost mode can then be calculated by the following equation:

$$t_{on,buckboost} = \frac{2\langle i_L \rangle_{buckboost}L_{IN}}{|v_{in}|} = \frac{2L_{IN}}{R_e}\left(1 + \frac{|v_{in}|}{V_{BUS}}\right). \quad (11)$$

Although the present disclosure has been described with respect to one or more particular embodiments, it will be understood that other embodiments of the present disclosure may be made without departing from the spirit and scope of the present disclosure.

What is claimed is:

1. A power converter, comprising:
an AC input having a phase input and a common neutral;
a DC bus;
a power factor correction (PFC) rectifier comprising:
a first half bridge connected from the common neutral to the DC bus, the first half bridge comprising a first switch connected in series with a second switch, the first switch having a closed state and the second switch having an open state when a voltage of the phase input is negative with respect to the common neutral;
a second half bridge connected from the phase input to the DC bus, the second half bridge comprising a third switch connected in series with a fourth switch, the third switch having a closed state and the fourth switch having an open state when the voltage of the phase input is positive with respect to the common neutral; and
an input inductor having a first end connected between the first switch and the second switch, and a second end connected between the third switch and the fourth switch; and
a controller configured to:
variably operate the first switch when the voltage of the phase input is positive with respect to the common neutral, and wherein the second switch operates in a complementary manner;
variably operate the third switch when the voltage of the phase input is negative with respect to the common neutral, and wherein the second switch operates in a complementary manner; and
wherein the operation of the first switch and the third switch is varied to control a current through the input inductor for a unity power factor at the AC input.

2. The power converter of claim 1, wherein the controller varies operation of the first switch and the third switch by varying one or more of the on-time, duty cycle, or switching frequency.

3. The power converter of claim 1, wherein the second switch and fourth switch are diodes.

4. The power converter of claim 1, wherein the second switch and the fourth switch are active switches.

5. The power converter of claim 1, wherein the controller further comprises:
a comparator configured to generate an error signal based on a sensed DC bus voltage signal and a bus reference signal;
a compensator configured to receive the error signal from the comparator and provide a comp signal based on a transfer function Gc;
a first bridge controller configured to operate a gate of the first switch and a gate of the second switch based on the comp signal; and
a second bridge controller configured to operate a gate of the third switch and a gate of the fourth switch based on the comp signal.

6. The power converter of claim 1, further comprising:
a capacitive element coupling the DC bus to the common neutral;
an AC output having a phase output;

an inverter comprising:
  a third half bridge connected from the common neutral to the DC bus, the third half bridge comprising a fifth switch connected in series with a sixth switch, the fifth switch having an open state and the sixth switch having a closed state when the voltage of the phase output is negative with respect to the common neutral;
  a fourth half bridge connected from the DC bus to the phase output, the fourth half bridge comprising a seventh switch connected in series with an eighth switch, the seventh switch having an open state and the eighth switch having a closed state when the voltage of the phase output is positive with respect to the common neutral; and
  an output inductor having a first end connected between the fifth switch and the sixth switch, and a second end connected between the seventh switch and the eighth switch; and
wherein the controller is further configured to:
  variably operate the sixth switch when the voltage of the phase input is positive with respect to the common neutral, and wherein the fifth switch operates in a complementary manner;
  variably operate the eighth switch when the voltage of the phase input is negative with respect to the common neutral, and wherein the seventh switch operates in a complementary manner; and
  wherein the operation of the sixth switch and the eighth switch is varied to control a voltage and/or current of the AC output.

7. The power converter of claim 6, wherein the controller further comprises:
  an output comparator configured to generate an output error signal based on a sensed AC output voltage and/or current signal and an output reference signal;
  a first output compensator configured to receive the output error signal and provide a first comp signal based on a buck-mode transfer function $G_{c,buck}$;
  a third bridge controller configured to operate a gate of the fifth switch and a gate of the sixth switch based on the first comp signal;
  a second output compensator configured to receive the output error signal and provide a second comp signal based on a buckboost-mode transfer function $G_{c,buckboost}$; and
  a fourth bridge controller configured to operate a gate of the seventh switch and a gate of the eighth switch based on the second comp signal.

8. The power converter of claim 6, wherein the controller is configured for bi-directional power conversion.

9. The power converter of claim 6, further comprising:
  a backup power input configured to receive backup DC power, the backup power input having a positive supply and a negative supply, the negative supply being connected to the common neutral.

10. The power converter of claim 9, further comprising a first four-quadrant switch connected from the second end of the input inductor to the positive supply of the backup power input.

11. The power converter of claim 10, further comprising a second four-quadrant switch connected from the first end of the input inductor to the positive supply of the backup power input.

12. The power converter of claim 9, further comprising:
  a backup half switch connected from the common neutral to the DC bus, the backup half bridge comprising a first backup switch connected in series with a second backup switch; and
  a backup inductor having a first end connected to the positive supply of the backup power input and a second end connected between the first backup switch and the second backup switch.

13. The power converter of claim 9, wherein the backup power input is a battery.

14. A three-phase power converter, comprising three converters according to claim 1, and wherein the common neutral of each converter is common to the three converters.

15. The power converter of claim 1, further comprising a zero-current detection circuit configured to generate a trigger voltage when a current of the input inductor falls below a negative threshold value in response to a positive input voltage and when the current of the input inductor rises above a positive threshold value in response to a negative input voltage.

16. The power converter of claim 1, wherein the controller is further configured to operate in boundary conduction mode for operation of the power converter as a soft-switched converter.

17. A DC-AC power converter, comprising:
  an AC output having a phase output and a common neutral;
  a DC bus;
  an inverter comprising:
    a first inverter half bridge connected from the common neutral to the DC bus, the first inverter half bridge comprising a first inverter switch connected in series with a second inverter switch, the first inverter switch having an open state and the second inverter switch having a closed state when the voltage of the phase output is negative with respect to the common neutral;
    a second inverter half bridge connected from the DC bus to the phase output, the second inverter half bridge comprising a third inverter switch connected in series with an fourth inverter switch, the third inverter switch having an open state and the fourth inverter switch having a closed state when the voltage of the phase output is positive with respect to the common neutral; and
  an output inductor having a first end connected between the first inverter switch and the first inverter switch, and a second end connected between the third inverter switch and the fourth inverter switch; and
  a controller configured to:
    variably operate the second inverter switch when the voltage of the phase output is positive with respect to the common neutral, and wherein the first inverter switch operates in a complementary manner;
    variably operate the fourth inverter switch when the voltage of the phase output is negative with respect to the common neutral, and wherein the third inverter switch operates in a complementary manner; and
    wherein the operation of the second inverter switch and the fourth inverter switch is varied to control a voltage and/or current of the AC output.

18. The power converter of claim 17, wherein the controller further comprises:
  an output comparator configured to generate an output error signal based on a sensed AC output voltage signal and an output reference signal;

a first output compensator configured to receive the output error signal and provide a first comp signal based on a buck-mode transfer function $G_{c,buck}$;

a first inverter bridge controller configured to operate a gate of the first inverter switch and a gate of the second inverter switch based on the first comp signal;

a second output compensator configured to receive the output error signal and provide an second comp signal based on a buckboost-mode transfer function $G_{c,buckboost}$; and a second inverter bridge controller configured to operate a gate of the third inverter switch and a gate of the fourth inverter switch based on the second comp signal.

19. A method for DC-AC power conversion, comprising:

providing a first inverter switch in series with a second inverter switch and connected from a neutral of an AC output to a DC bus;

switching the first inverter switch and the second inverter switch when a reference voltage and/or current is positive, so as to provide a positive component of an AC voltage and/or current on a phase output of the AC output;

providing a third inverter switch in series with a fourth inverter switch and connected from the phase output to the DC bus; and switching the third inverter switch and the fourth inverter switch when the reference voltage and/or current is negative, so as to provide a negative component of the AC voltage and/or current on the phase output.

* * * * *